US 9,804,827 B2

United States Patent
Hayashi et al.

(10) Patent No.: US 9,804,827 B2
(45) Date of Patent: Oct. 31, 2017

(54) INFORMATION PROCESSING SYSTEM AND MANAGEMENT APPARATUS

(71) Applicant: Hitachi, Ltd., Tokyo (JP)

(72) Inventors: Masato Hayashi, Tokyo (JP); Chihiro Yoshimura, Tokyo (JP); Masanao Yamaoka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 417 days.

(21) Appl. No.: 14/645,872

(22) Filed: Mar. 12, 2015

(65) Prior Publication Data

US 2016/0063391 A1 Mar. 3, 2016

(30) Foreign Application Priority Data

Aug. 29, 2014 (JP) ................ 2014-176541

(51) Int. Cl.
*G06N 99/00* (2010.01)
*G06F 7/58* (2006.01)
*G06N 7/00* (2006.01)

(52) U.S. Cl.
CPC ............. *G06F 7/588* (2013.01); *G06N 7/005* (2013.01); *G06N 99/00* (2013.01); *G06N 99/002* (2013.01)

(58) Field of Classification Search
None
See application file for complete search history.

(56) References Cited

U.S. PATENT DOCUMENTS

2014/0046626 A1 2/2014 Yamamoto et al.

FOREIGN PATENT DOCUMENTS

JP 2012-217518 A 11/2012
WO WO 2012/118064 A1 9/2012

OTHER PUBLICATIONS

Utsunomiya, et al., Mapping of Ising models onto injection-locked laser systems, Optics Express 18091, vol. 19, No. 19, 2011, pp. 1-18.*

* cited by examiner

*Primary Examiner* — Wilbert L Starks
(74) *Attorney, Agent, or Firm* — Foley & Lardner LLP

(57) ABSTRACT

A highly-convenient information processing system capable of obtaining a solution of a problem under conditions desired by a user and a management apparatus capable of enhancing the convenience of the information processing system are suggested. An information processing system includes: a host unit equipped with one or more semiconductor chips that execute a ground-state search of an Ising model; and an operation unit that provides a user interface for a user to designate a problem; and a management unit that converts the problem designated by the user by using the user interface into the Ising model and controls the host unit to have the semiconductor chip perform the ground-state search of the converted Ising model; wherein the user can designate a condition for solving the problem by using the user interface; wherein the management unit generates an operating condition of the semiconductor chip according to the condition designated by the user and reports the generated operating condition and the Ising model of the problem designated by the user to the host unit; and wherein the host unit controls the semiconductor chip in accordance with the operating condition reported from the management unit.

9 Claims, 37 Drawing Sheets

| Number of Mounted Chips | 2 |
|---|---|
| Total Number of Spin Units | 65536 |
| Number of X-direction Spin Units | 128 |
| Number of Y-direction Spin Units | 128 |
| Number of Z-direction Spin Units | 2 |
| Working Speed | 100MHz |

| Total Number of Spin Units | 32768 |
|---|---|
| Number of X-direction Spin Units | 128 |
| Number of Y-direction Spin Units | 128 |
| Number of Z-direction Spin Units | 2 |

FIG. 19

Ising Model

Interaction Coefficient 100

| Interaction Source Spin | Interaction Destination Spin | Interaction Coefficient |
|---|---|---|
| v1 | v2 | J12 |
| v2 | v1 | J21 |
| v1 | v3 | J13 |
| v1 | v2 | J12 |

External Magnetic Field Coefficient 101

| Spin | External Magnetic Field Coefficient |
|---|---|
| v1 | h1 |
| v2 | h2 |

Normalize $J_{i,j}$ to $0 \leq J_{i,j} \leq 1$

Legend

- $V_i$      Spin Identifier
- $J_{ij}$      Interaction Coefficient (i-th spin→j-th spin)
- $h_i$      External Magnetic Field Coefficient (i-th spin)

Number of Updates of Solver Operating Conditions

Number of Updates of Solver Operating Conditions

INFORMATION PROCESSING SYSTEM AND MANAGEMENT APPARATUS

CROSS-REFERENCES TO RELATED APPLICATIONS

This application relates to and claims priority from Japanese Patent Application No. 2014-176541, filed on Aug. 29, 2014, the entire disclosure of which is incorporated herein by reference.

BACKGROUND

Field of the Invention

The present invention relates to an information processing system and a management apparatus. Particularly, the invention is suited for use in an information processing system having a function solving problems such as combinatorial optimization by using semiconductor chips which perform a ground-state search of Ising models.

Description of Related Art

Various physical phenomena and social phenomena can be expressed with interaction models. An interaction model is a model defined by a plurality of nodes constituting the model and interactions between the nodes, and bias for each node if necessary. Various models are suggested in physics and social science, but any of them can be interpreted as one form of interaction models. Furthermore, as an example of characteristics of the interaction model, influences between the nodes are limited to interactions between two nodes (interactions between two bodies). For example, considering dynamics of planets in outer space, it can be interpreted as one type of interaction model as there are interactions by universal gravitation between the nodes which are the planets; however, influences between the planets are not limited to those between two planets and three or more planets influence each other and exhibits complicated behaviors (thereby causing problems such as so-called "three-body problems" or "N-body problems").

In the world of biology, a neural network which models a brain can be listed as an example of the interaction model. The neural network has artificial neurons, which simulate nerve cells, as nodes and there are interactions called synaptic connections between the artificial neurons. Also, a bias may be given to each neuron. Regarding the world of social science, for example, if you think about human communications, you could easily understand that there are nodes called humans and interactions composed of languages and communications. Also, it is easily imaginable that each human has its individual bias. Accordingly, there is a study to try clarifying properties of the human communications by simulating them as an interaction model (for example, Japanese Patent Application Laid-Open (Kokai) Publication No. 2012-217518).

On the other hand, an Ising model can be an example of a representative interaction model in the world of physics. The Ising model is a model of statistical dynamics to explain behaviors of a magnetic substance. The Ising model is defined by spins having two values, that is, +1/−1 (or 0/1 or up/down), an interaction coefficient indicative of an interaction between the spins, and an external magnetic field coefficient for each spin.

Energy of the Ising model at the relevant time can be calculated from a spin alignment, the interaction coefficient, and the external magnetic field coefficient which are defined. An energy function of the Ising model can be generally represented by the following expression.

[Math. 1]

$$E(s) = -\sum_{i<j} J_{i,j}\sigma_i\sigma_j - \sum_i h_i\sigma_i \quad (1)$$

Incidentally, $\sigma_i$ and $\sigma_j$ represent i-th and j-th spin values, respectively; $J_{i,j}$ represents the interaction coefficient between the i-th and j-th spins; $h_i$ represents the external magnetic field coefficient for the i-th spin; and $\sigma$ represents the spin alignment.

A first term of expression (1) is to calculate energy attributable to the interaction between the spins. Generally, the Ising model is expressed as an undirected graph and does not distinguish between an interaction from the i-th spin to the j-th spin or an interaction from the j-th spin to the i-th spin. Therefore, the first term calculates the influence of the interaction coefficient with respect to a combination of $\sigma_i$ and $\sigma_j$ that satisfy i<j. Also, a second term is to calculate energy attributable to the external magnetic field for each spin.

A ground-state search of the Ising model is an optimization problem to find a spin alignment that minimizes the energy function of the Ising model. It is known that when the range of the interaction coefficient and the external magnetic field coefficient is not limited, finding the ground state of the Ising model whose topology becomes a nonplanar graph is an NP-hard problem.

The ground-state search of the Ising model is used not only to explain behaviors of a magnetic substance which is originally a target of the Ising model, but also for various uses. This can be because the Ising model is the simplest model based on interactions and also has the capability to express various phenomena attributable to interactions. For example, Japanese Patent Application Laid-Open (Kokai) Publication No. 2012-217518 discloses a method for estimating the degree of stress in a group such as a workplace organization by using the ground-state search of the Ising model.

Furthermore, the ground-state search of the Ising model also deals with a maximum cut problem known as an NP-hard graph problem. Such a graph problem is widely applicable to, for example, community detection in social networks and segmentation for image processing. Therefore, any solver that performs the ground-state search of the Ising model can be applied to such various problems.

Since finding the ground state of the Ising model is an NP-hard problem as described above, solving the problem with von Neumann computers is difficult in terms of calculation time. While an algorithm that introduces heuristics to increase the speed is suggested, there is suggested a method of finding the ground state of the Ising model at high speeds, without using the von Neumann computers, by calculation that utilizes physical phenomena more directly, that is, by using analogue computers (for example, WO2012/118064).

Such a device requires alignment corresponding to a problem to be solved. In a case of the Ising model, elements that represent each one of spins and an interaction between the relevant spin and another spin (hereinafter referred to as the "element units") are required corresponding to the number of spins in the Ising model for which the ground state should be searched. For example, with the device disclosed in WO 2012/118064, spins are associated with lasers and, therefore, lasers whose quantity is proportionate to the number of spins are required. In other words, high scalability that enables mounting of numerous element units is required.

In consideration of the above-described circumstances, the ground-state search of the Ising model should preferably be performed with a solid-state component such as a semiconductor device that can be implemented by regularly arranging numerous element units. Particularly, it is desirable that such a solid-state component has an array structure represented by a storage apparatus such as a DRAM (Dynamic Random Access Memory) or an SRAM (Static Random Access Memory) and the element unit has a simple structure to enhance accumulation ability. Therefore, in recent years; the applicant of the present application has been developing such semiconductor devices (hereinafter referred to as the Ising chips).

Meanwhile, when constructing a system for solving problems such as combinatorial optimization by using such Ising chips, such a system should preferably be constructed so that conditions desired by a user about certain matters can be set and a solution according to the conditions can be obtained.

The present invention was devised in consideration of the above-described circumstances and aims at suggesting a highly-convenient information processing system capable of obtaining solutions of problems such as combinatorial optimization under conditions desired by the user and a management apparatus capable of enhancing the convenience of the information processing system.

SUMMARY

In order to solve the above-described problem, an information processing system that finds a solution of a problem by searching for a ground state of an Ising model is provided according to an aspect of the present invention, wherein the information processing system includes: a host unit equipped with one or more semiconductor chips that execute the ground-state search of the Ising model; an operation unit that provides a user interface for a user to designate the problem; and a management unit that converts the problem designated by the user by using the user interface into the Ising model and controls the host unit to have the semiconductor chip perform the ground-state search of the converted Ising model; wherein the user can designate, in addition to the problem, a condition for solving the problem by using the user interface; wherein the management unit generates an operating condition of the semiconductor chip according to the condition designated by the user and sends the generated operating condition and the Ising model of the problem designated by the user to the host unit; and wherein the host unit controls the semiconductor chip to perform the ground-state search of the Ising model sent from the management unit in accordance with the operating condition sent from the management unit.

Furthermore, a management apparatus connected to a computer equipped with one or more semiconductor chips executing a ground-state search of an Ising model is provided according to an aspect of the present invention, wherein the management apparatus includes: a receiver that accepts inputs of a problem whose solution needs to be found, a type of the problem, required precision for solving the problem, and time limit; a conversion unit that converts the problem into a problem of the Ising model based on a specified conversion rule according to the type of the problem; an operating condition generation unit that decides an operating condition of the semiconductor chip according to the time limit; a problem division unit that divides the problem of the Ising model into one or more partial problems according to throughput of the computer; a control unit that sends the partial problem, the operating condition, and an instruction to execute the ground-state search to the computer and receives a result of the ground-state search from the computer; and an evaluation unit that evaluates whether the result of the ground-state search satisfies the required precision or not.

According to the present invention, it is possible to implement an information processing system, which is capable of obtaining solutions of problems such as combinatorial optimization under conditions desired by the user and is thereby highly convenient, and a management apparatus capable of enhancing the convenience of the information processing system.

BRIEF DESCRIPTION OF THE DRAWINGS

FIG. 19 is a conceptual diagram illustrating a data structure example of an Ising model according to this embodiment;

DETAILED DESCRIPTION OF PREFERRED EMBODIMENTS

An embodiment of the present invention will be described below in detail with reference to the attached drawings.

(1-1) Ising Model Extended to Directed Graph

In this embodiment a model extended from an Ising model and represented by the following expression (2) will be hereinafter referred to as the Ising model. (1) first embodiment

[Math. 2]

$$E(s) = -\sum_{i \neq j} J_{i,j} \sigma_i \sigma_j - \sum_i h_i \sigma_i \quad (2)$$

The difference between the Ising model represented by expression (1) and the model represented by expression (2) is that expression (2) permits interactions as shown in a directed graph. Generally, the Ising model can be drawn as an undirected graph according to graph theory. This is because interactions of the Ising model do not distinguish between an interaction coefficient $J_{i,j}$ from the i-th spin to the j-th spin and an interaction coefficient $J_{j,i}$ from the j-th spin to the i-th spin.

Since the present invention can be applied even by extending the Ising model and distinguishing between $J_{i,j}$ and $J_{j,i}$, the Ising model which is formed into a directed graph is handled in this embodiment. Incidentally, if the Ising model which is an undirected graph is to be handled by using the Ising model which is a directed graph, it can be done simply by defining the same interaction coefficient for two directions, that is, $J_{i,j}$ and $J_{j,i}$. In this case, even if the same model is used, a value of the energy of the energy function according to expression (2) is twice as much as the energy of the energy function according to expression (1).

Figure 1:
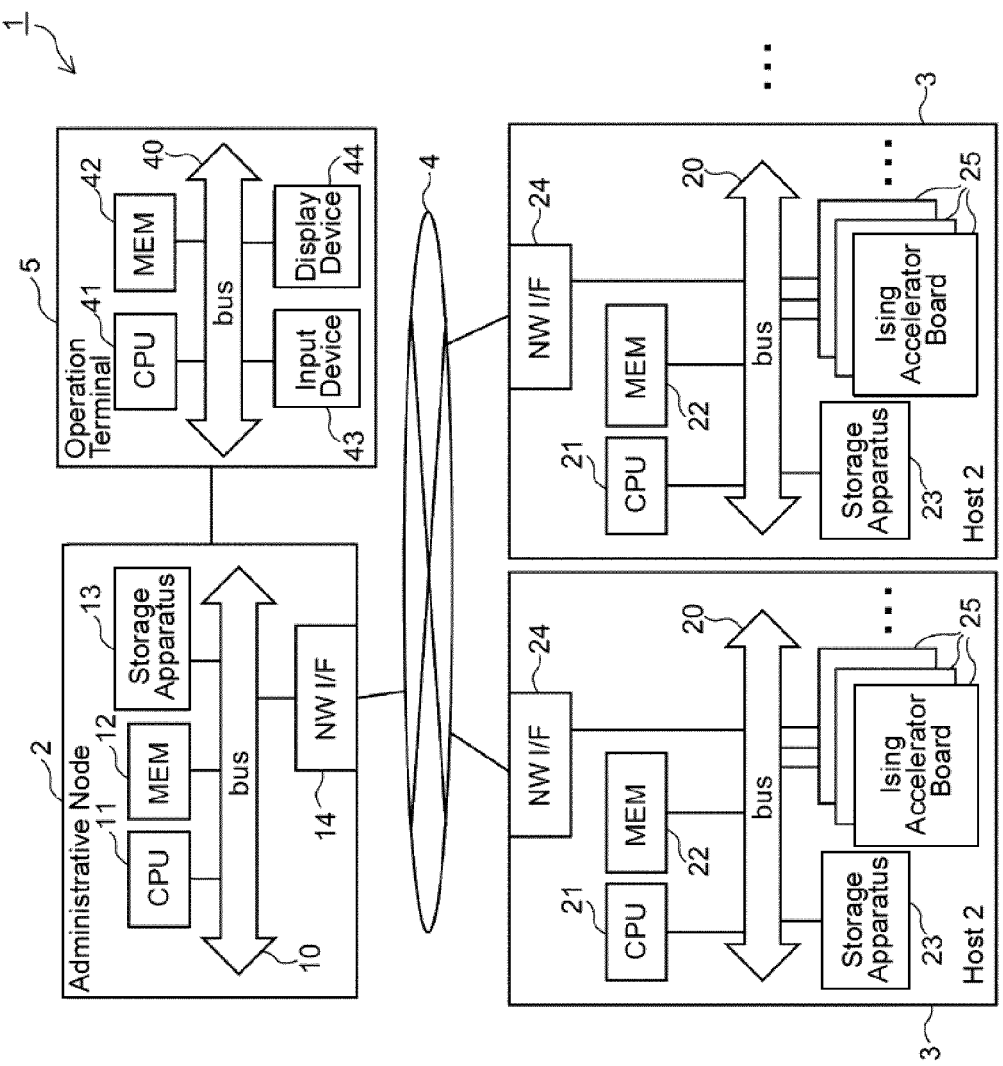
FIG. 1 is a block diagram illustrating an overall configuration of an information processing system according to a first embodiment.

(1-2) Configuration of Information Processing System According to this Embodiment (1-2-1) Overall Configuration of Information Processing System Referring to FIG. 1, reference numeral 1 represents an information processing system as a whole according to this embodiment. This information processing system 1 is configured so that an administrative node 2 and a plurality of hosts 3 are connected via a network 4 so that they can freely communicate with each other; and an operation terminal 5 is connected to the administrative node 2.

The administrative node 2 is a server apparatus having a function that manages each host 3 connected to the network 4 in response to users requests given from the operation terminal 5; and I configured by including a CPU (Central Processing Unit) 11, a memory 12, a storage apparatus 13, and a network interface 14, which are mutually connected via an internal bus 10.

The CPU 11 is a processor that controls operation of the entire administrative node 2. Furthermore, the memory 12 is composed of, for example, a volatile semiconductor memory and is used mainly to store various programs and various information. The storage apparatus 13 is composed of, for example, hard disk drives or SSDs (Solid State Drives) and is used to retain programs and data for a long period of time. The network interface 14 is composed of, for example, an NIC (Network Interface Card) and performs protocol control upon communications with external equipment via the network 4.

The host 3 is composed of, for example, a personal computer, a workstation, or a server; and includes a CPU 21, a memory 22, a storage apparatus 23, and a network interface 24, and a plurality of Ising accelerator boards 25, which are mutually connected via the internal bus 20. The CPU 21 is a processor that controls operation of the entire host 3. Furthermore, the memory 22 is used mainly to store various programs and various information. The storage apparatus 23 is composed of, for example, hard disk drives or SSDs and is used to retain programs and data for a long period of time.

The Ising accelerator board 25 is a dedicated accelerator board that performs the ground-state search of the Ising model; and is configured by including a controller 30, a memory 31, a plurality of Ising chips 32, a plurality of random number generators 33, which are provided corresponding to the respective Ising chips 32, and an interface 34.

The controller 30 is a processor having a function that controls the respective Ising chips 32 and the respective random number generators 33, which are mounted in the present Ising accelerator board 25, in accordance with instructions given from the administrative node 2 via the network 4. Furthermore, the memory 31 is composed of, for example, a ROM (Read Only Memory) and stores programs executed by the controller 30 and various the information.

The Ising chip 32 is dedicated hardware for performing the ground-state search of Ising models and independently searches the ground state (that is, executes interaction operations) of an Ising model, which is assigned to its own Ising chip 32, under control of the controller 30. Furthermore, the random number generator 33 generates a random bit string (that is, a random number) to prevent the ground-state search executed by each Ising chip 32 as described below from falling into a local optimal solution. The random number generated by the random number generator 33 is supplied to each corresponding Ising chip 32. The interface 34 performs protocol control upon communications with the CPU 21 (FIG. 1) for the host 3 via the internal bus 20 (FIG. 1).

The operation terminal 5 is a terminal device composed of a computer device such as a personal computer; and is configured by including a CPU 41, a memory 42, an input device 43, and a display device 44, which are mutually connected via an internal bus 40. The CPU 41 is a processor that controls operation of the entire operation terminal 5. The memory 42 is composed of, for example, a volatile semiconductor memory and is used mainly to store various programs and various information. Various processing of the operation terminal 5 is executed as a whole as described later as the CPU 41 executes the programs stored in the memory 42.

The input device 43 is composed of, for example, a mouse and a keyboard and is used for the user to make various inputs. The display device 44 is composed of, for example, a liquid crystal panel. The display device 44 displays, for example: a problem input screen 110, which will be described later with reference to FIG. 20, for the user to designate, for example, a problem to be solved by using the Ising model, such as a combinatorial optimization problem, and conditions for solving the problem; and result presentation screens 120 to 122, which will be described later with reference to FIG. 21 to FIG. 23, for presenting a solution of the problem as obtained by the ground-state search of the Ising model processing executed by each host 3.

(1-2-2) Configuration of Ising Chip

Figure 3:
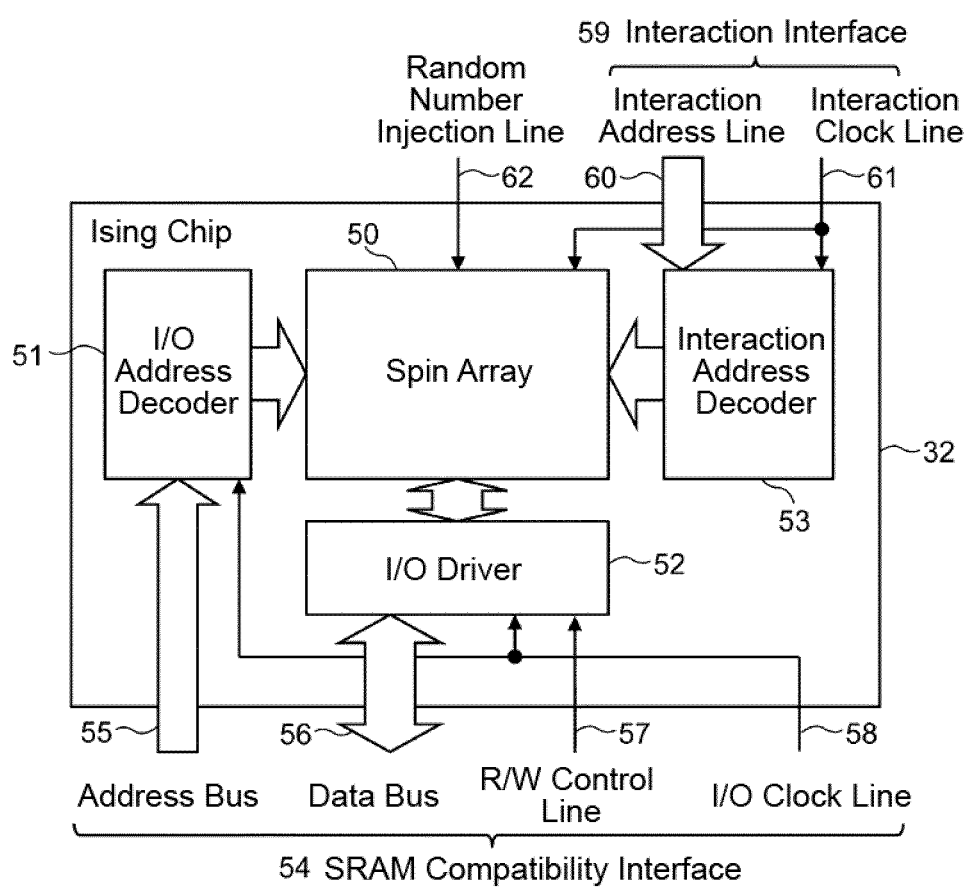
FIG. 3 is a block diagram illustrating the configuration of an Ising chip.

FIG. 3 shows a schematic configuration of the Ising chip 32. The Ising chip 32 includes a spin array 50, an I/O (Input/Output) address decoder 51, an I/O driver 52, and an interaction address decoder 53 as shown in this FIG. 3. This embodiment will be explained by assuming that the Ising chip 32 is mounted as a CMOS (Complementary Metal-Oxide Semiconductor) integrated circuit which is currently widely known; however, other types of solid-state component are also feasible.

The Ising chip 32 includes, as an SRAM compatibility interface 54 for reading/writing data to/from the spin array 50, an address bus 55, data bus 56, R/W control line 57 and I/O dock line 58. Furthermore, the Ising chip 32 also includes an interaction address line 60 and interaction dock line 61 as an interaction control interface 59 for controlling the ground-state search of the Ising model.

The Ising chip 32 expresses all of the spin $\sigma_i$, the interaction coefficient $J_{i,j}$, and the external magnetic field coefficient $h_i$ of the Ising model with information stored in memory cells in the spin array 50. Setting of an initial state of the spin $\sigma_i$ and reading of a solution after completion of the ground-state search are performed via the SRAM compatibility interface 54. Furthermore, with the Ising chip 32, reading/writing of the interaction coefficient $J_{i,j}$ and the external magnetic field coefficient $h_i$ to set the Ising model, whose ground state should be searched, to the spin array 50 is also performed via the SRAM compatibility interface 54.

Therefore, an address is assigned to the spin $\sigma_i$, the interaction coefficient $J_{i,j}$, and the external magnetic field coefficient $h_j$ of the spin array 50. Then, when the spin $\sigma_i$, the interaction coefficient $J_{i,j}$ or the external magnetic field coefficient $h_i$ is read from or written to the Ising chip 32, the relevant address is given from the controller 30 (FIG. 2) of the Ising accelerator board 25 to the I/O address decoder 51 via the address bus 55 and an R/W control signal for controlling reading/writing of the spin $\sigma_i$, the interaction coefficient $J_{i,j}$, and the external magnetic field coefficient $h_i$ is given from the controller 30 to the I/O driver 52 via the R/W control line 57.

Consequently, the I/O address decoder 51 activates a word line in the spin array 50 according to the address given via the address bus 55 and the I/O driver 52 activates a corresponding bit line in the spin array 50 according to the R/W control signal given via the R/W control line 57. As a result, an initial value of the spin $\sigma_i$ and values of the interaction coefficient $J_{i,j}$ and the external magnetic field coefficient $h_i$, which have been given via the data bus 56, are set to the spin array 50 or the solution after completion of the ground-state search is read from the spin array 50 and is sent to the controller 30 (FIG. 2) of the Ising accelerator board 25 via the data bus 56.

Incidentally, the address bus 55, the data bus 56, and the R/W control line 57 which constitute the SRAM compatibility interface 54 operate in synchronization with an I/O clock sent from the outside to the Ising chip 32 via the I/O clock line 58. However, according to the present invention, the interface does not have to be synchronous and may be asynchronous. This embodiment will be explained on the premise that the interface is synchronous.

Furthermore, the Ising chip 32 implements interactions between spins within the spin array 50 in order to perform the ground-state search. The interaction control interface 59 is used in order to control such interactions from the outside. Specifically speaking, the Ising chip 32 inputs an address to designate a spin group to perform an interaction given by the controller 30 (FIG. 2) of the Ising accelerator board 25 via the interaction address line, and performs the interaction in synchronization with the interaction clock, which is input via the interaction clock line 61 (not shown in the drawing), from the interaction dock generator. The interaction address decoder 53 reads/writes the interaction coefficient $J_{i,j}$ and the external magnetic field coefficient $h_j$ from/to the spin array 50 according to the address given the interaction address line 60.

In addition, the Ising chip 32 includes a random number injection line 62 that injects a random number to stochastically invert a value of the memory cell which represents spins in the Ising model as described later. The random number generated by this random number generator 33 described earlier with reference to FIG. 2 is given to the spin array 50 via this random number injection line 62.

(1-2-3) Configuration of Spin Array

The spin array 50 is configured so that numerous spin units are arranged as element units where each spin unit retains one spin $\sigma_i$ and its associated interaction coefficient $J_{i,j}$ and external magnetic field coefficient $h_i$ and implements ground-state search operation.

Figure 4:
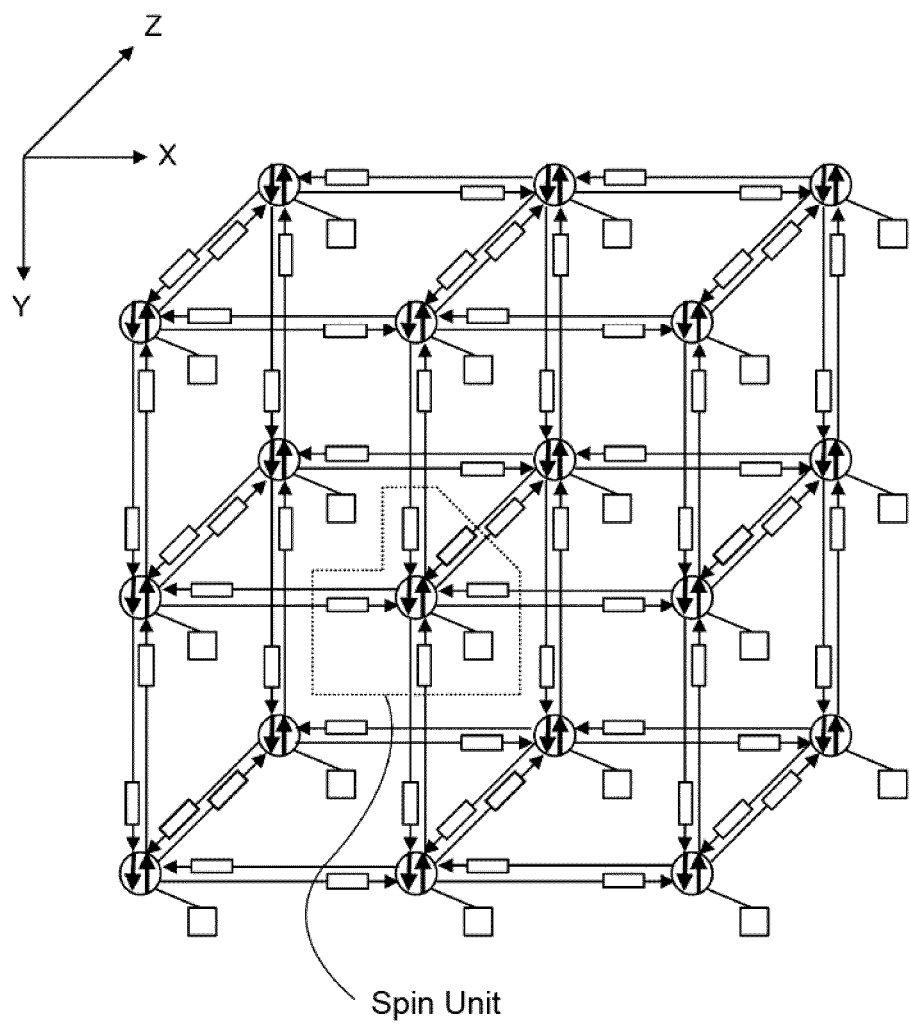
FIG. 4 is a conceptual diagram for explaining an Ising model.

FIG. 4 shows an example in which an Ising model having a three-dimensional lattice topology is configured by arranging a plurality of spin units. The example in FIG. 4 is a three-dimensional lattice of a 3 (X-axis direction)×3 (Y-axis direction)×2 (Z-axis direction) size. Coordinate axes are defined as illustrated in the drawing so that the right direction in the drawing is an X-axis, the downward direction in the drawing is a Y-axis, and the depthwise direction in the drawing is a Z-axis; however, these coordinate axes are defined as necessary merely for the convenience of easy explanation of the embodiment and are irrelevant to the present invention. If a topology other than the three-dimensional lattice such as a free-shaped topology is used, for example, the number of steps of the tree will be used to represent positions separately from the coordinate axes. If interactions between the spins are interpreted as a graph in the three-dimensional-lattice-shaped topology in FIG. 4, a spin of order 5 at maximum (vertex) will be required. Incidentally, if connection of the external magnetic field coefficient is also taken into consideration, degree 6 at maximum will be required.

Values of adjacent spins (for example, in a case of five adjacent spins $\sigma_j$, $\sigma_k$, $\sigma_l$, $\sigma_m$, $\sigma_n$) are input to one spin unit 70 shown in FIG. 4. Therefore, the spin unit 70 has memory cells to retain these adjacent spin values to be input. The spin unit 70 also has memory cells to retain, in addition to the above-mentioned spin values, the external magnetic field coefficient and interaction coefficients with the above-mentioned adjacent spins (the interaction coefficients $J_{j,i}$, $J_{k,i}$, $J_{l,i}$, $J_{m,i}$, $J_{n,i}$ with the five adjacent spins), respectively.

Meanwhile, an Ising model has interactions generally represented by an undirected graph as described earlier. The aforementioned expression (1) includes $J_{i,j} \times \sigma_i \times \sigma_j$ as a term representing an interaction, which indicates an interaction from the i-th spin to the j-th spin. In this case, a general Ising model does not distinguish between the interaction from the i-th spin to the j-th spin and an interaction from the j-th spin to the i-th spin. In other words, $J_{i,j}$ and $J_{j,i}$ are the same. However, with the Ising chip 32 according to this embodiment, this Ising model is extended to a directed graph (expression (2)) as described earlier and realizes asymmetric interactions, that is, the interaction from the i-th spin to the j-th spin and the interaction from the j-th spin to the i-th spin. As a result, model representation capability enhances, thereby making it possible to represent many problems with small-scale models.

Therefore, if one spin unit is the i-th spin $\sigma_i$, the interaction coefficients $J_{j,i}$, $J_{k,i}$, $J_{l,i}$, $J_{m,i}$, $J_{n,i}$ retained by this spin unit determine interactions from the adjacent j-th, k-th, l-th, m-th, and n-th spins $\sigma_j$, $\sigma_k$, $\sigma_l$, $\sigma_m$, $\sigma_n$ to the i-th spin $\sigma_i$. This corresponds to the fact that arrows (interactions) corresponding to the interaction coefficients included in the spin unit in FIG. 4 are directed from spins outside the spin unit shown in the drawing towards spins inside the spin unit.

(1-2-4) Configuration of Spin Unit

Figure 7:
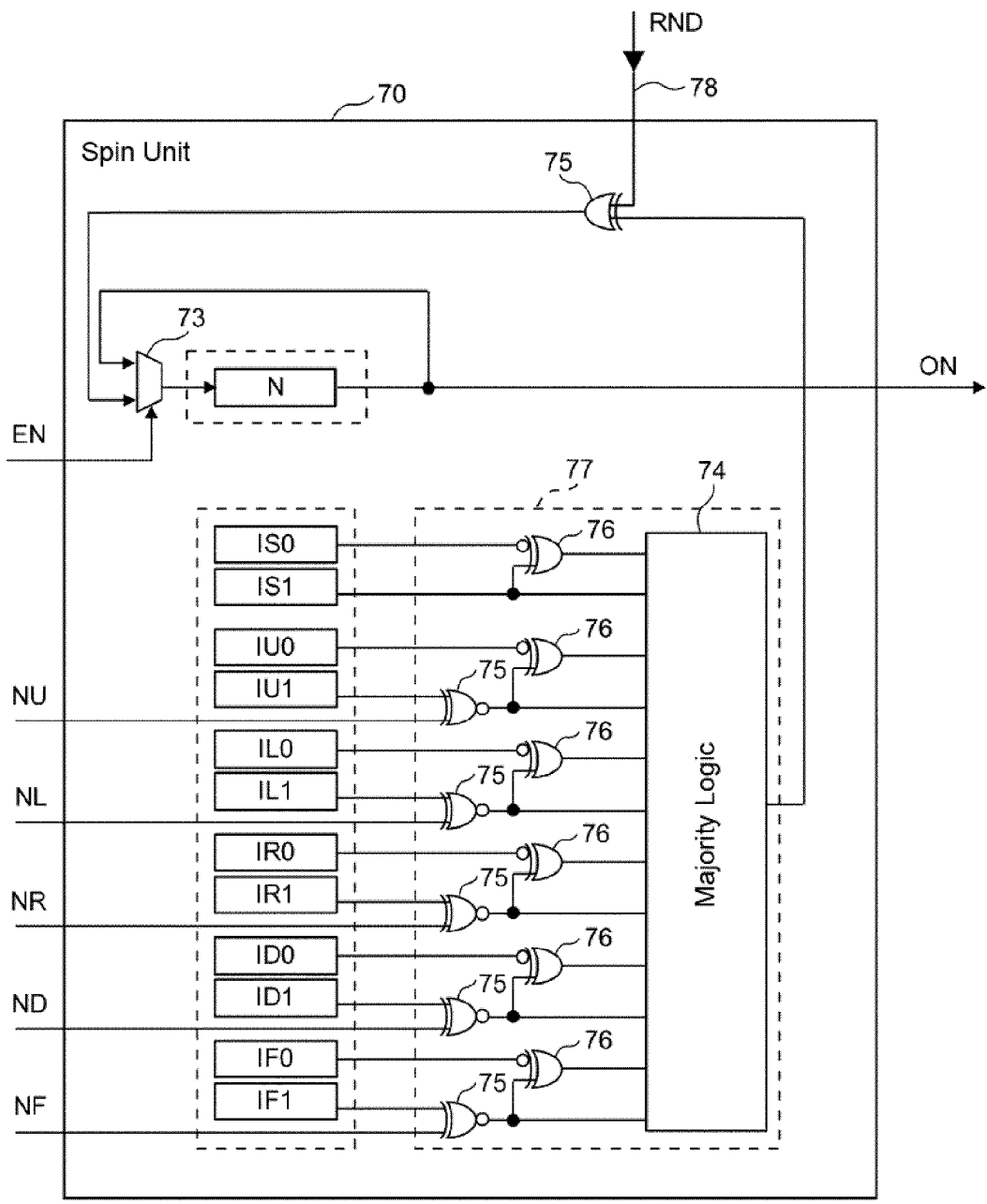
FIG. 7 is a block diagram illustrating the configuration of a spin unit.
Figure 8:
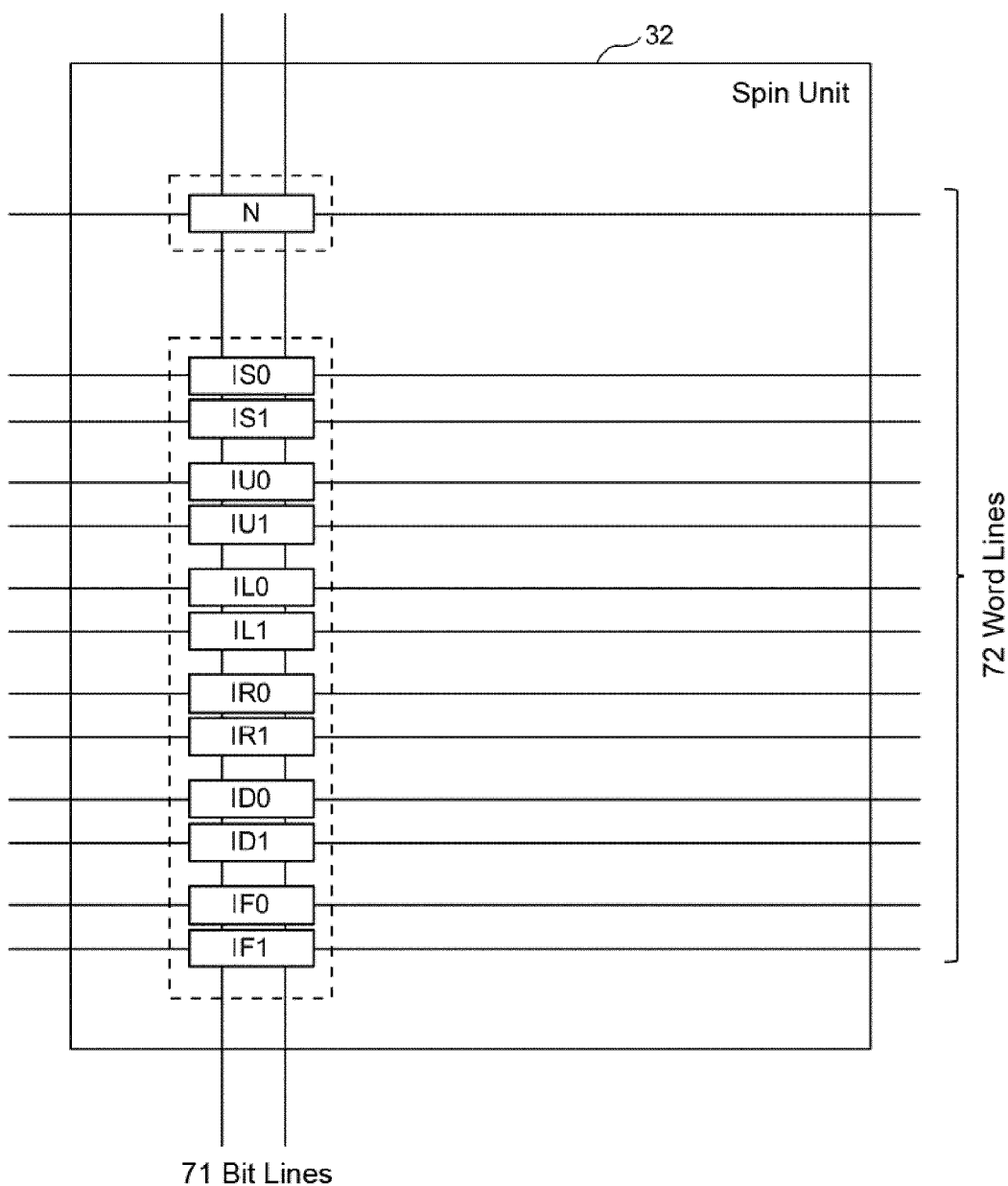
FIG. 8 is a block diagram illustrating the configuration of a spin unit.

A configuration example of the spin unit 70 will be described with reference to FIG. 7 and FIG. 8. The spin unit 70 has to sides, which will be explained separately by using FIG. 7 and FIG. 8 as a matter of convenience; however, one spin unit 70 includes both configurations of FIG. 7 and FIG. 8. FIG. 7 illustrates a circuit for implementing interactions within the spin unit 70 and FIG. 8 illustrates the configuration of the spin unit 70 by focusing on the bit lines 71 and the word lines 72 which are interfaces for accessing memory cells N, IS0, IS1, IU0, IU1, IL0, IL1, IR0, IR1, ID0, ID1, IF0, IF1 included in the spin unit 70 from outside the Ising chip 32.

The spin unit 70 includes a plurality of 1-bit memory cells N, IS0, IS1, IU0, IU1, IL0, IL1, IR0, IR1, ID0, ID1, IF0, IF1 for retaining the spin $\sigma_i$, the interaction coefficients $J_{j,i}$ to $J_{n,i}$, and the external magnetic field coefficient $h_i$ of the Ising model. Incidentally, two memory cells serve their role as a pair as follows: the memory cells IS0 and IS1, the memory cells IU0 and IU1, the memory cells IL0 and IL1, the memory cells IR0 and IR1, the memory cells ID0 and ID1, and the memory cells IF0 and IF1. So, they will be hereinafter collectively referred to as the memory cell pair ISx, IUx, ILx, IRx, IDx, or IFx (see FIG. 5).

Now, the spin unit 70 will be described as a spin unit that represents the i-th spin. The memory cell N is a memory cell to represent a spin and retains a spin value. The spin value is +1/−1 (+1 may be expressed as up and −1 may be expressed as down) in the Ising model and this is made to correspond to 0/1 which is a binary value retainable by the memory cell. For example, +1 corresponds to 1 and −1 corresponds to 0.

Figure 5:
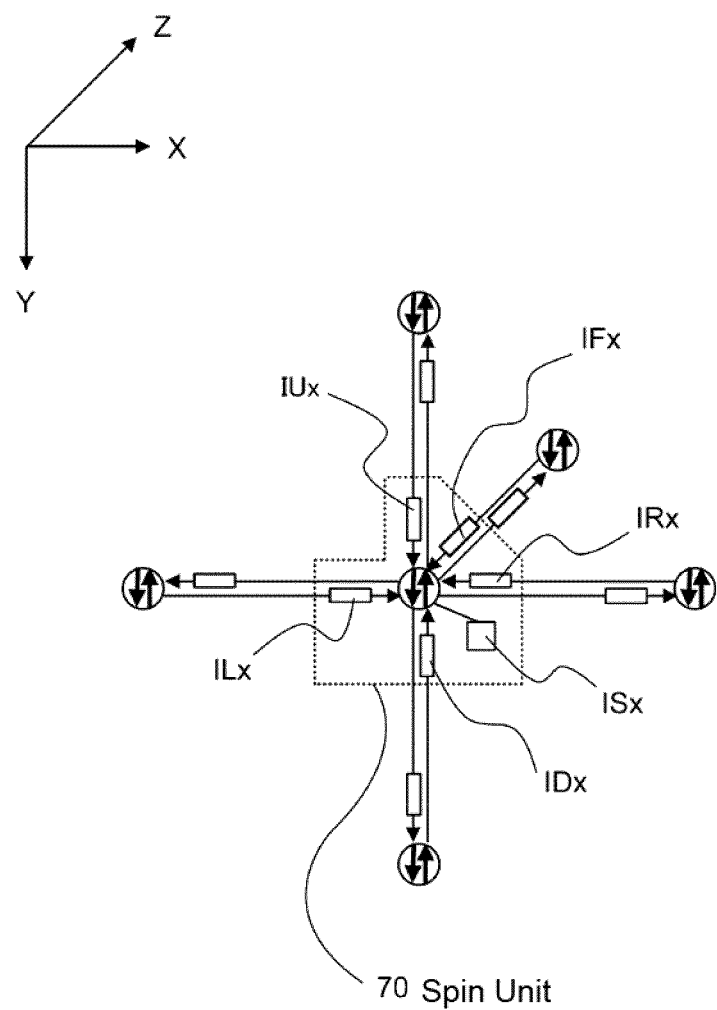
FIG. 5 is a conceptual diagram for explaining an Ising model.

FIG. 5 is used to show a correspondence relationship between the memory cell pairs ISx, IUx, ILx, IRx, IDx, and IFx of the spin unit 70 and the topology of the Ising model shown in FIG. 4. The memory cell pair ISx stores the external magnetic field coefficient. Furthermore, each of the memory cell pairs IUx, ILx, IRx, IDx, and IFx stores an interaction coefficient. Specifically speaking, the memory cell pair IUx stores an interaction coefficient with an upper-side spin (−1 in the Y-axis direction); the memory cell pair ILx stores an interaction coefficient with a left-side spin (−1 in the X-axis direction); the memory cell pair IRx stores an interaction coefficient with a right-side spin (+1 in the X-axis direction); the memory cell pair IDx stores an interaction coefficient with a down-side spin (+1 in the Y-axis direction); and the memory cell pair IFx stores an interaction coefficient with a spin connected in a depthwise direction (+1 or −1 in the Z-axis direction).

Furthermore, if the Ising model is recognized as a directed graph and is seen from a certain spin, other spins have coefficients that influence the relevant spin. The coefficients by which the relevant spin influence the other spins belong to the respective other spins. Specifically speaking, this spin unit 70 is connected to five spins at maximum. With the Ising chip 32 according to this embodiment, the external magnetic field coefficient and the interaction coefficients correspond to three values, +1/0/−1. Therefore, a 2-bit memory cell is required to represent each of the external magnetic field coefficient and the interaction coefficients.

The memory cell pairs ISx, IUx, ILx, IRx, IDx, and IFx represent the three values +1/0/−1 by using a combination of two memory cells whose number at the end of their reference signs is 0 or 1 (for example, in a case of the memory cell pair ISx, the memory cells IS0 and IS1). For example, in the case of the memory cell pair ISx, the memory cell IS1 represents +1/−1; and when a value retained by the memory cell IS1 is 1, it represents +1; and when the value retained by the memory cell IS1 is 0, it represents −1.

In addition, when the value retained by the memory cell IS0 is 0, the external magnetic field coefficient is recognized as 0; and the value retained by the memory cell IS0 is 1, either of +1/−1 determined by the value retained by the memory cell IS1 is recognized as the external magnetic field coefficient. When the external magnetic field coefficient is 0 and if it is assumed that the external magnetic field coefficient is disabled, you can say that the value retained by the memory cell IS0 is an enable bit of the external magnetic field coefficient (the external magnetic field coefficient is enabled when IS0 is 1). Similarly, the memory cell pairs IUx, ILx, IRx, IDx, and IFx which store the interaction coefficients have the coefficients and the bit values correspond to each other.

Each of the memory cells N, IS0, IS1, IU0, IU1, IL0, IL1, IR0, IR1, ID0, ID1, IF0, and IF1 in the spin unit 70 must be designed so that data can be read from or written to it from outside the Ising chip 13. Therefore, each spin unit 70 has the bit lines 71 and the word lines 72 as shown in FIG. 8.

Figure 9:
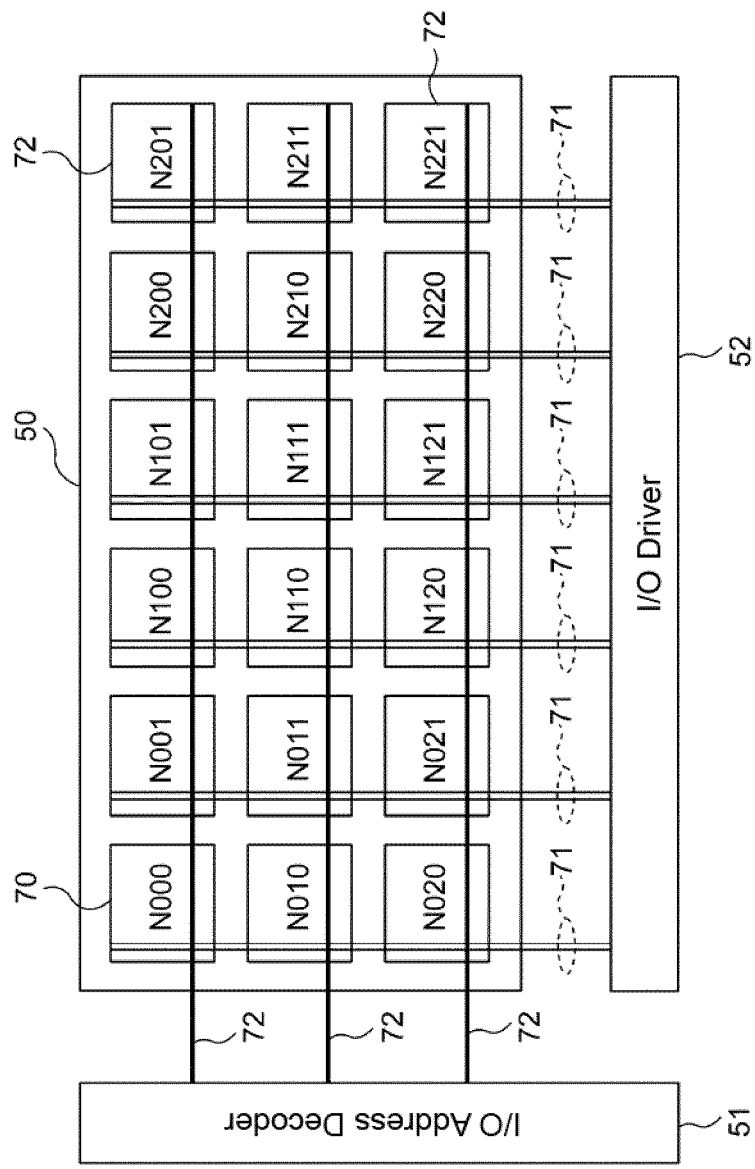
FIG. 9 is a block diagram for explaining a connection relationship between an I/O address decoder, an I/O driver, and each spin unit.

Then, with the Ising chip 32, the spin units 70 are arranged in a tile-like manner on a semiconductor substrate as shown in FIG. 9 and they are connected via the bit lines 71 and the word lines 72; and data can be read from or written to the memory cells in the spin unit 70 via the SRAM compatibility interface 54 of the Ising chip 32 in the same manner as in a case of a general SRAM by controlling the spin units 70 using the I/O address decoder 51 and the I/O driver 52.

Figure 6:
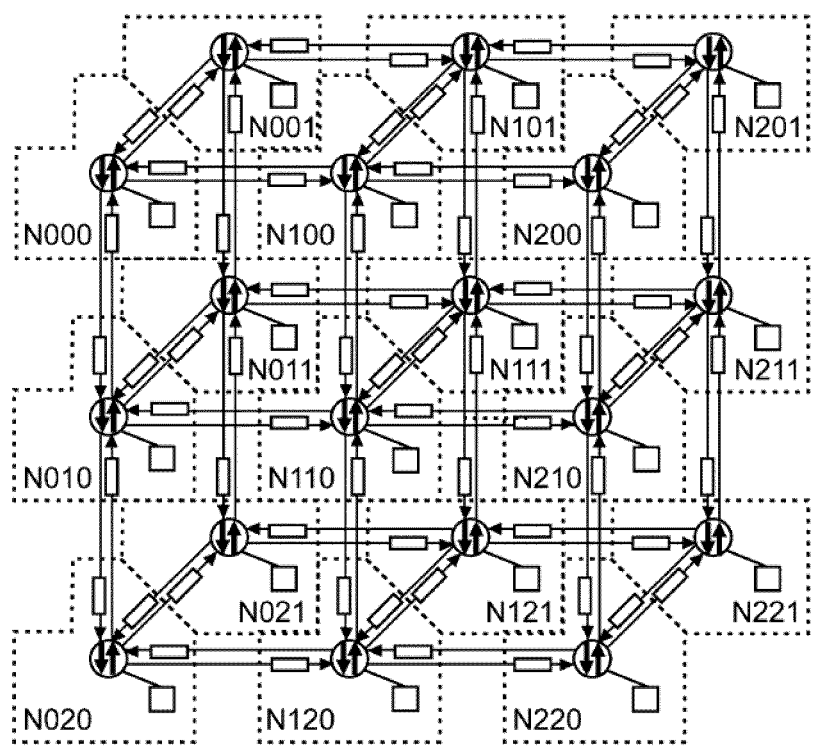
FIG. 6 is a conceptual diagram for explaining an Ising model.

Incidentally, FIG. 6 shows which vertexes in the topology of the three-dimensional lattice the spin units represented in FIG. 9 (the reference sing is assigned as, for example, Nxyz according to the position on the X-axis; the Y-axis, and the Z-axis) correspond to. Each lattice vertex is located as if to insert each lattice vertex of an Z-axis-directional lattice vertex array into a space between X-axis-directional lattice vertex arrays in order to locate the 3×3×2 three-dimensional lattice vertexes on a two-dimensional plane. Specifically speaking, while Nx0z, Nx1z, Nx2z, and so on are located in the Y-axis direction (the down-side of the drawing is the Y-axis positive direction) on the two-dimensional plane in FIG. 9, spin units whose Z-axis direction coordinates are 0 and 1 are located alternately like N0y0, N0y1, N1y0, N1y1, N2y0, N2y1, and so on in the X-axis direction (the right side of the drawing is the X-axis positive direction).

Furthermore, since the spin units 70 are updated at the same time, each spin unit 70 independently has a circuit for deciding the state of the next spin by calculating each interaction. Referring to FIG. 7, the spin unit 70 has signal lines EN, NU, NL, NR, ND, NF, ON, and GND as interfaces with the outside. The signal line EN is an interface for inputting a switching signal which permits updates of spins of the relevant spin unit 70. By controlling a selector 73 using this switching signal, the spin value retained by the memory cell N can be updated to a value given from a majority logic circuit 74 described later via an OR circuit 75 to the selector 73.

The signal line ON is an interface for outputting the spin value of the relevant spin unit 70 to other spin units 70 (adjacent spin units 70 in the topology in FIG. 4). Each of the signal lines NU, NL, NR, ND, and NF is an interface for inputting a spin value retained by each of the other spin units 70 (the adjacent units in the topology in FIG. 4). The signal line NU receives input from the upper-side spin (−1 in the Y-axis direction); the signal line NL receives input from the left-side spin (−1 in the X-axis direction); the signal line NR receives input from the right-side spin (+1 in the X-axis direction); the signal line ND receives input from the down-side spin (+1 in the Y-axis direction); and the signal line NF receives input from the spin connected in the depthwise direction (+1 or −1 in the Z-axis direction).

Regarding the spin unit 70, the next state of the relevant spin is decided so as to minimize energy between the adjacent spins. This is equivalent to judging either one of a positive value and a negative value is controlling with respect to a product of the adjacent spins and the interaction coefficients and the external magnetic field coefficient. For example, assuming that the spins $\sigma_j$, $\sigma_k$, $\sigma_l$, $\sigma_m$, and $\sigma_n$ are adjacent to the i-th spin $\sigma_i$, the next state of the spin $\sigma_i$ is decided as described below.

Firstly, it is assumed that values of the adjacent spins are $\sigma_j=+1$, $\sigma_k=-1$, $\sigma_l=+1$, $\sigma_m=-1$, and $\sigma_n=+1$, the interaction coefficients are $J_{j,i}=+1$, $J_{k,i}=+1$, $J_{l,i}=+1$, $J_{m,i}=-1$, and $J_{n,i}=-1$, and the external magnetic field coefficient is $h_i=+1$. Products of the interaction coefficients and the adjacent spins and the external magnetic field coefficient under this circumstance are as follows: $\sigma_j \times J_{j,i}=+1$, $\sigma_k \times J_{k,i}=-1$, $\sigma_l \times J_{l,i}=+1$, $\sigma_m \times J_{m,i}=+1$, $\sigma_n \times J_{n,i}=-1$, and $h_i=+1$. The external magnetic field coefficient may be considered as an interaction coefficient with a spin whose value is always +1.

Now, local energy between the i-th spin and the adjacent spins is obtained by multiplying each of the aforementioned coefficients by the i-th spin value and further inverting the sign. For example, the local energy with the j-th spin becomes: −1 when the i-th spin is +1; and +1 when the i-th spin is −1. So, the spins work in a direction to reduce the local energy under this circumstance when the i-th spin is +1.

When thinking about the local energy with respect to the external magnetic field coefficient between all the adjacent spins, the calculation is performed to find out which value of the i-th spin, either +1 or −1, can reduce the energy. This may be done simply by counting the number of the values +1 and −1 to see which is larger the number of +1 or the number of −1 when the aforementioned products of the interaction coefficients and the adjacent spins and the external magnetic field coefficient are listed. In the aforementioned example, there are four +1 and two −1. If the i-th spin is +1, a sum of energy will be −2; and if the i-th spin is −1, the sum of energy will be +2. Therefore, the next state of the i-th spin to minimize the energy can be decided by a majority of the spin values, that is, by deciding the next state of the i-th spin as +1 when the number of +1 is larger, and as −1 when the number of −1 is larger.

The logical circuit 77 shown in FIG. 7 is a circuit for performing the above-described interactions. Firstly, an XNOR circuit 75 is used to find an exclusive NOR (XNOR) of the state of the adjacent spins and the values retained by the memory cells IU1, IL1, IR1, ID1, IF1 which indicate the interaction coefficients +1/−1. Accordingly, the next state of the relevant spin to minimize the energy can be calculated merely by considering its interactions (it is assumed that +1 is encoded as 1 and −1 is encoded as 0).

If the interaction coefficients are only +1/−1, the next state of the relevant spin can be decided by a majority logic, that is, by having a majority logic circuit 74 determine which is larger the number of +1 or the number of −1 among outputs from the XNOR circuit 75. Regarding the external magnetic field coefficient, assuming that it corresponds to an interaction coefficient with a spin whose state is always +1, simply the value of the external magnetic field coefficient becomes a value that should be input to the majority logic circuit 41 which decides the next state of the spin.

Next, a method of realizing the coefficient 0 will be discussed. When there is a majority logic f with n input (I1, I2, I3, and so on up to In), the following proposition can be recognized as true. Firstly, it is assumed that there are duplicates I'1, I'2, I'3, and so on up to I'n of inputs I1, I2, I3, and so on up to In (Ik=I'k for arbitrary k). Under this circumstance, output from f (I1, I2, I3, and so on up to In) is equivalent to that off to which the duplicates are also input (I1, I2, I3, and so on up to In and I'1, I'2, I'3, and so on up to I'n). In other words, even if two values are input as each input variable, the output will be invariant. Furthermore, it is assumed that, besides the inputs I1, I2, I3, and so on up to In, another input Ix and its inverted value !Ix exist. Under this circumstance, output from f (I1, I2, I3, and so on up to In, Ix, !Ix) is equivalent to that off (I1, I2, I3, and so on up to In). Specifically speaking, when the input variables and their inverted values are input, the function works to cancel influences of the input variables by a majority. The coefficient 0 is realized by making use of this property of the majority logic.

Specifically speaking, as shown in FIG. 7, a duplicate of a candidate value of the next state of the relevant spin as mentioned above or its inverted value is simultaneously input to the majority logic circuit 74, depending on a value of the bit which determines enabling of the coefficient (the bit retained in each of the memory cells IS0, IU0, IL0, IR0, ID0, and IF0), by using the XOR circuit 76. For example, if a value of the bit retained by the memory cell IS0 is 0, the value of the bit retained in the memory cell IS1 and a value obtained by inverting the value of the bit retained by the memory cell IS1 are simultaneously input to the majority logic circuit 41. So, there will be no influence of the external magnetic field coefficient (the external magnetic field coefficient corresponds to 0). Furthermore, if the value of the bit retained by the memory cell IS0 is 1, the value of the bit retained by the memory cell IS1 and the same value (duplicate) as the above value are input simultaneously to the majority logic circuit 41.

Figure 10:
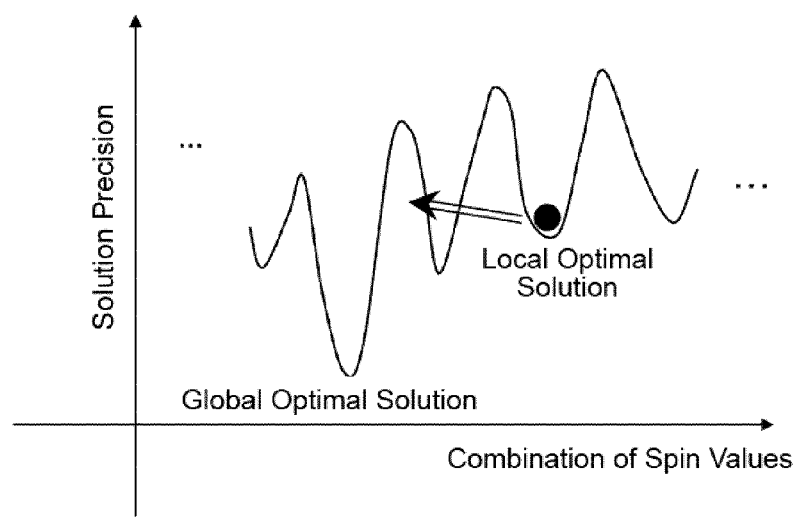
FIG. 10 is a conceptual diagram for explaining a local optimal solution.

On the other hand, the ground-state search of the applied Ising model can be realized by energy minimization by means of interactions between the aforementioned spins, but as shown in FIG. 10, performing only the ground-state search might result in a local optimal solution and might not reach a global optimal solution. Basically, there are only movements in a direction to reduce the energy. So, once the calculation results in the local optimal solution, it is impossible to get out of it and reach a global optimal solution.

Therefore, in the embodiment, the spin unit 70 includes a RND line 78 as an interface in order to stochastically invert the spin value retained by the memory cell N as a method for escaping from the local optimal solution. Then, the random number given to the spin array 50 (FIG. 3) by the corresponding random number generator 33 (FIG. 2) via the random number injection line 62 (FIG. 3) as mentioned earlier is given to the spin unit 70 via this RND line 78; and the spin value is stochastically inverted by inputting this random number to the OR circuit 75.

Figure 11:
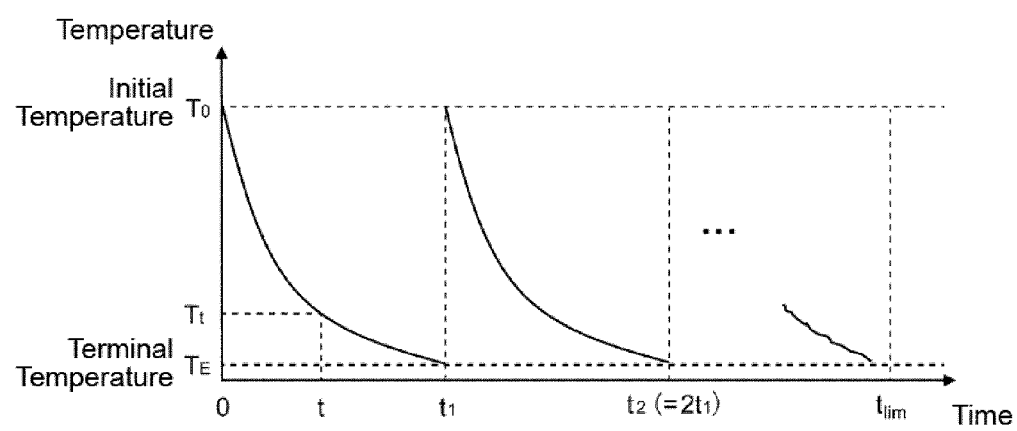
FIG. 11 is a characteristic curve diagram for explaining a cooling schedule.

When this happens, the random number generator 33 generates the random number to cause the spin value to invert at probability determined by temperature $T_t$ of a cooling schedule (a schedule that previously defines in what pattern the random number generator 33 is caused to generate the random number) which is represented by an exponential function that monotonously decreases as time passes, where $T_0$ represents an initial temperature, $T_E$ represents a terminal temperature, and $t_1$ represents one cycle of the ground-state search as shown in FIG. 11.

Figure 12:
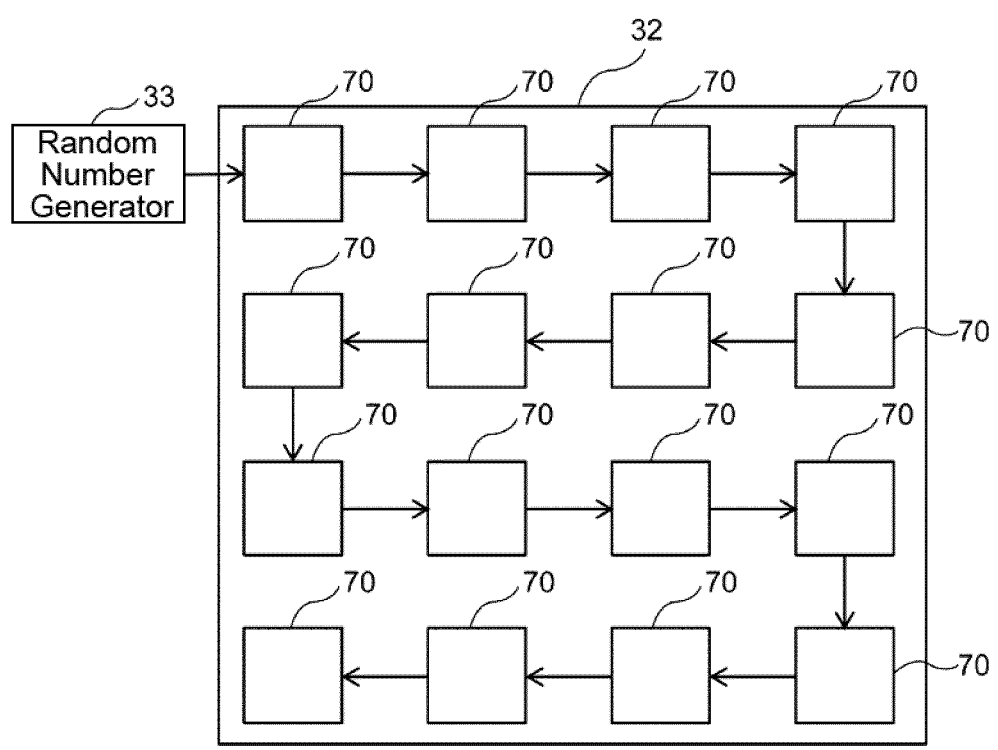
FIG. 12 is a conceptual diagram for explaining a transmission path for a random number between spin units in an Ising chip.

Incidentally, FIG. 12 shows a transmission path for the random number between the spin units 70 in the Ising chip 32. The random number supplied from the random number generator 33 is sequentially transmitted to the adjacent spin units 70 in a lateral direction or longitudinal direction within the Ising chip 32 as shown in this FIG. 12.

(1-2-5) Logical Configuration of Information Processing System

Figure 13:
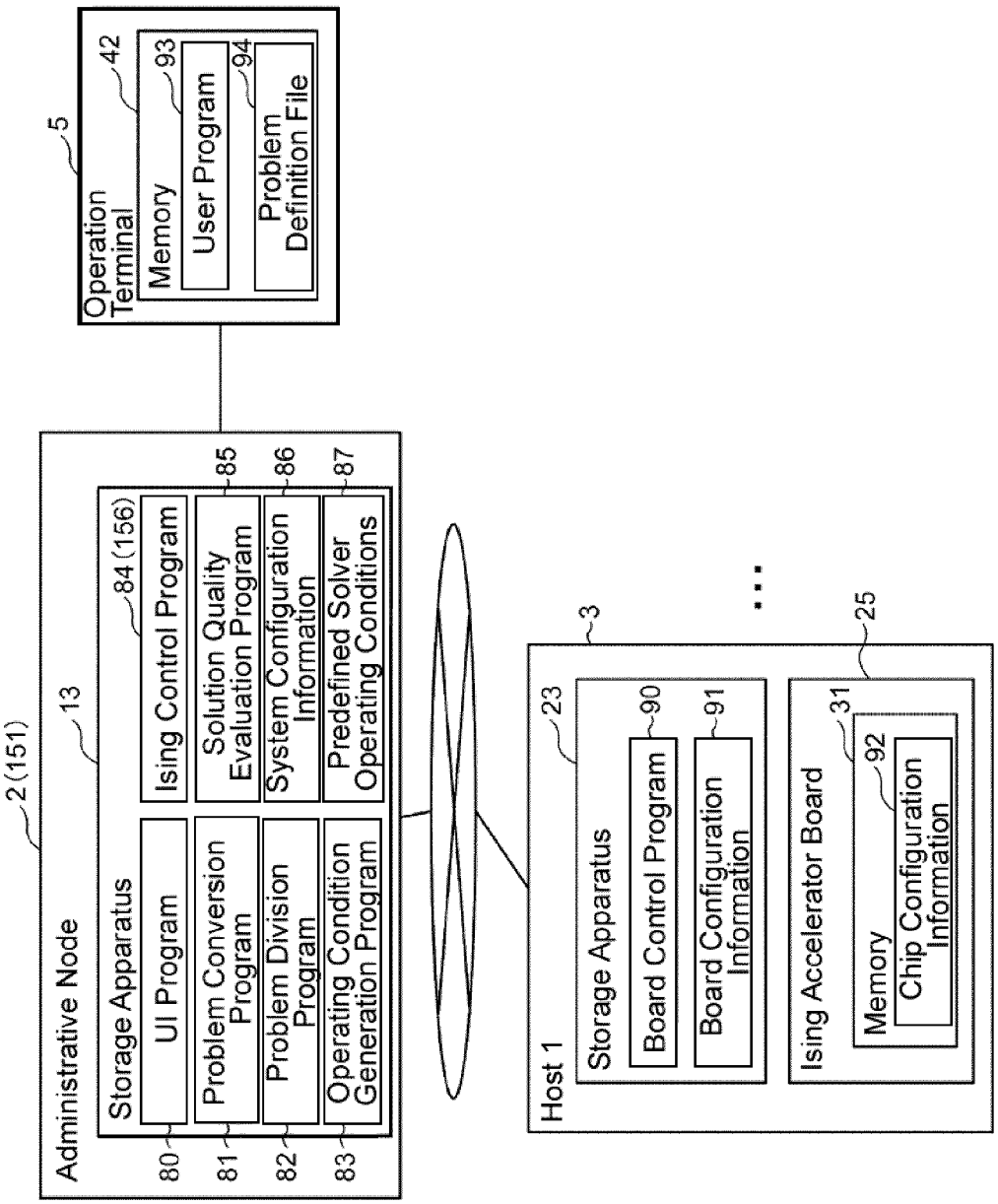
FIG. 13 is a block diagram illustrating a logical configuration of the information processing system.

FIG. 13 shows a logical configuration of the information processing system 1 according to this embodiment. In the case of this information processing system 1 as shown in as shown in FIG. 13, the storage apparatus 13 for the administrative node 2 stores, as programs, a UI (User Interface) program 80, a problem conversion program 81, a problem division program 82, an operating condition generation program 83, an Ising control program 84, and a solution quality evaluation program 85 and also stores, as information, system configuration information 86 and predefined solver operating conditions 87. Furthermore, the storage apparatus 23 for each host 3 stores a board control program 90 and a board configuration information 91; the memory 31 for each Ising accelerator board 25 stores chip configuration information 92; and the memory 42 for the operation terminal 5 stores a user program 93 and a problem definition file 94.

The UI program 80 is a program having a function that displays, for example, a necessary GUI and information on the operation terminal 5 in response to, for example, requests from the user using the operation terminal 5 (FIG. 1); and the problem conversion program 81 is a program having a function that converts a program defined in the problem definition file 94 supplied from the operation terminal 5 as described later (hereinafter referred to as the original problem) into an Ising model. Furthermore, the problem division program 82 is a program having a function that generates a plurality of sub-problems from the original problem as necessary and divides the sub-problem into partial problems for each host 3.

The operating condition generation program 83 is a program having a function that generates operating conditions of an Ising chip 32 that satisfies the user's request based on conditions such as solution precision and limited which will be described later with reference to FIG. 20 and are designated by the user by using the operation terminal 5, and the predefined solver operating conditions 87 described later (hereinafter referred to as the solver operating conditions). Furthermore, the Ising control program 84 is a program having a function that controls individual Ising chips 32 (FIG. 2) in each Ising accelerator board 25 mounted in each host 3. Furthermore, the solution quality evaluation program 85 is a program having a function that evaluates the quality of a solution obtained by the ground-state search executed by the host 3.

Figure 14:
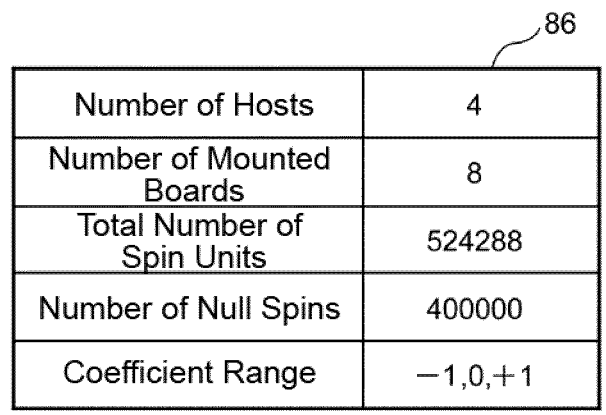
FIG. 14 is a conceptual diagram for explaining system configuration information.

The system configuration information 86 is information about each host 3 managed by the administrative node 2 and includes information such as the number of hosts; the number of mounted boards, the total number of spin units; the number of null spins, and a coefficient range as shown in FIG. 14. The number of hosts represents a total number of hosts 3 existing in the information processing system 1; and the number of mounted boards represents a total number of Ising accelerator boards 25 existing in the information processing system 1. Furthermore, the total number of spin units represents a total number of spin units 70 (FIG. 7) existing in the information processing system 1; and the number of null spins represents the number of spin units 70 which are not used at that time among the spin units 70 existing in the information processing system 1. Furthermore, the coefficient range represents the range of the interaction coefficient and the external magnetic field coefficient of Ising models whose ground-state can be searched at this information processing system 1. In the case of this embodiment, the range of the interaction coefficient and the external magnetic field coefficient is three values of +1, 0, and −1.

Figure 15:
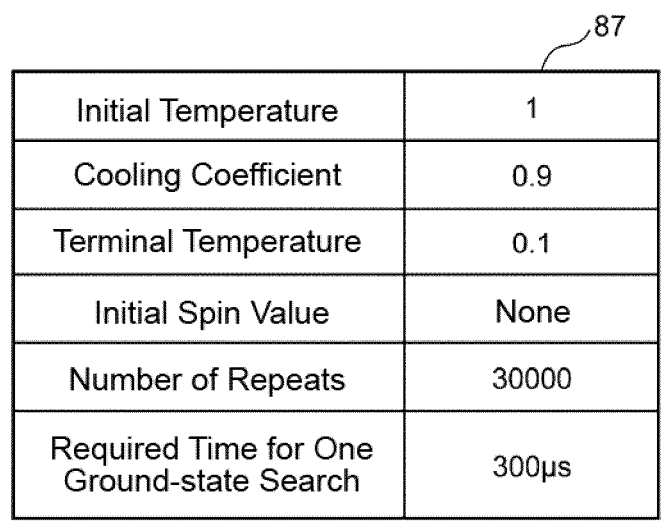
FIG. 15 is a conceptual diagram illustrating an example of predefined solver operating conditions.

The predefined solver operating conditions 87 are operating conditions that are defined in advance as initial values of the solver operating conditions. In the case of this embodiment, an initial temperature, a cooling coefficient, a terminal temperature, an initial spin value, the number of repeats, and required time for one ground-state search are defined as the predefined solver operating conditions as shown in FIG. 15.

The initial temperature, the cooling coefficient, and the terminal temperature are parameters for controlling each random number generator 33 (FIG. 2) in the Ising accelerator board 25 as described above. Furthermore, the initial spin value represents a spin value that should be set to each spin unit 70 in this information processing system 1. However, since these spin values can be generated randomly, it is not always necessary to set the initial spin value as the predefined solver operating condition.

Furthermore, the number of repeats represents the number of repeats of interaction operations that should be executed by each Ising chip 32 during one ground-state search; and the required time for one ground-state search represents time required for one ground-state search. With this information processing system 1, one ground-state search is performed by having each Ising chip 32 repeatedly execute the interaction operation as many time as the number of repeats; and a solution is found by repeating execution of the ground-state search until the time limit designated on a problem input screen 110 described later with reference to FIG. 20 comes.

On the other hand, the board control program 90 (FIG. 13) is a program having a function that controls each Ising chip 32 on each Ising accelerator board 25 existing in the present host when receiving an instruction from the Ising control program 84 of the administrative node 2.

Figure 16:
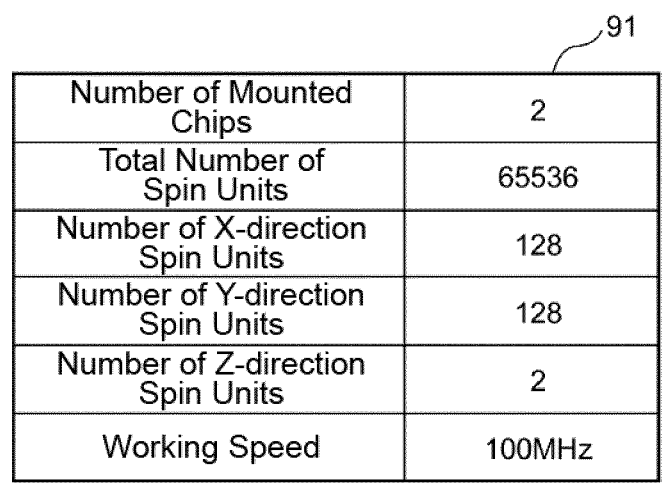
FIG. 16 is a conceptual diagram for explaining board configuration information.

Furthermore, the board configuration information 91 is information about the respective Ising accelerator boards 25 mounted in the present host and includes information such as the number of mounted chips, the total number of spin units, the number of X-direction spin units, the number of Y-direction spin units, the number of Z-direction spin units, and a working speed as shown in FIG. 16.

The number of mounted chips represents the quantity of Ising chips 32 mounted on the corresponding Ising accelerator board 25; and the total number of spin units represents a total number of spin units 70 on that Ising accelerator board 25. Furthermore, the number of X-direction spin units, the number of Y-direction spin units, and the number of Z-direction spin units represents the number of spin units in the X-direction, Y-direction, and Z-direction, respectively, of the Ising model which can be expressed by the Ising accelerator board 25; and the working speed represents the working speed of that Ising accelerator board 25.

Incidentally, the board configuration information 91 shown in FIG. 16 is information about one Ising accelerator board 25 and the storage apparatus 23 for the host 3 stores the board configuration information 91 for each Ising accelerator board 25 mounted on the present host.

Figure 17:
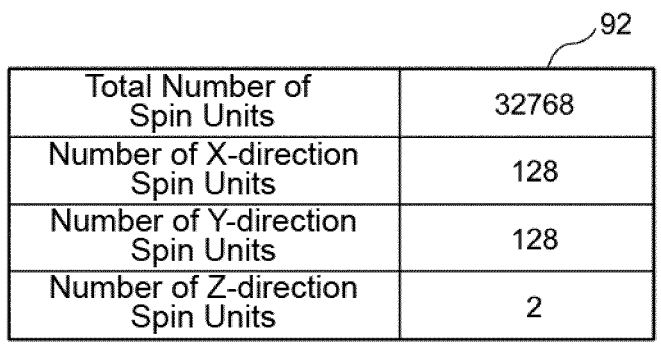
FIG. 17 is a conceptual diagram for explaining chip configuration information.

On the other hand, the chip configuration information 92 (FIG. 13) is information about the Ising chips 32 mounted on the present Ising accelerator board and includes information such as a total number of spin units, the number of X-direction spin units, the number of Y-direction spin units, and the number of Z-direction spin units as shown in FIG. 17.

The total number of spin units represents a total number of spin units 70 mounted on the corresponding Ising chip 3Z and the number of X-direction spin units, the number of Y-direction spin units, and the number of Z-direction spin units represents the number of spin units in the X-direction, Y-direction, and Z-direction, respectively, of the Ising model which can be expressed by the Ising chip 32.

Incidentally, the chip configuration information 92 shown in FIG. 17 is information about one Ising chip 32 and the memory 31 for the Ising accelerator board 25 stores the chip configuration information 92 for each Ising chip 32 mounted on the present Ising accelerator board.

Furthermore, the user program 93 is a program having a function that displays, for example, a problem input screen 110 described later with reference to FIG. 20 and result presentation screens 120 to 122 described later with reference to FIG. 21 to FIG. 23 on the display device 44 (FIG. 1) according to the user's operation or in accordance with instructions from the UI program 80 of the administrative node 2.

Figure 18:
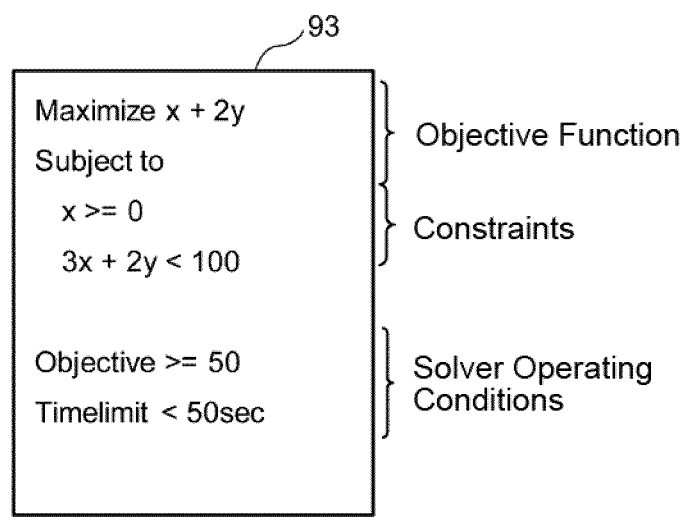
FIG. 18 is a conceptual diagram illustrating an example of a problem definition file.

Furthermore, the problem definition file 94 is a file which is created by the user in advance and in which a problem to be solved by using the Ising model is defined. For example, as shown in FIG. 18, the problem definition file 94 in which a linear programming problem is defined includes each piece of information about an objective function and constraints. FIG. 18 shows a problem to find x and y that minimizes "x+2y" under constraints of "x≥0" and "3x+2y<100." Incidentally, FIG. 18 shows an example in which solver operating conditions that are target solution precision (objective) of "50"% or more and calculation time (Timelimit) of less than "50 sec" are also defined in the problem definition file 94; however, the solver operating conditions do not necessarily have to be defined in the problem definition file 94 in advance and may be designated on the problem input screen 110 described later with reference to FIG. 20.

(1-2-6) Data Structure Examples of Ising Model

FIG. 19 shows a data structure example of an Ising model that can be obtained by problem conversion of the problem definition file 94, which is supplied from the administrative node 2 of the operation terminal 5, by the problem conversion program 81 of the administrative node 2. Referring to this FIG. 19, an Ising model is composed of an interaction definition part 100 which defines interaction coefficients, and an external magnetic field coefficient part 101 which defines external magnetic field coefficients.

The interaction definition part 100 recognizes a set of an identifier for designating a spin which is a source of an interaction (for example, a unique number is assigned to the spin and that number is recognized as the identifier), an identifier of a spin which is a destination of the interaction, and an interaction coefficient and lists up as many such sets as the number of interactions. This is close to an adjacent list which is a data structure used when handling a graph in a computer.

The external magnetic field coefficient definition unit 101 recognizes a set of an identifier for designating a spin, which gives an external magnetic field, and an external magnetic field coefficient and lists up as many such sets as the number of external magnetic field coefficients.

Incidentally, the interaction coefficient between spins which are not defined by the interaction definition part 100, or the external magnetic field coefficient for any spin which is not defined by the external magnetic field coefficient 101 is set as 0. In other words, a default value in a case of the interaction coefficient is 0 that represents no existence of the interaction between the relevant spins; and a default value in a case of the external magnetic field coefficient is 0 that represents no external magnetic field for the relevant spin.

(1-3) Various Screens Displayed on Operation Terminal

Figure 20:
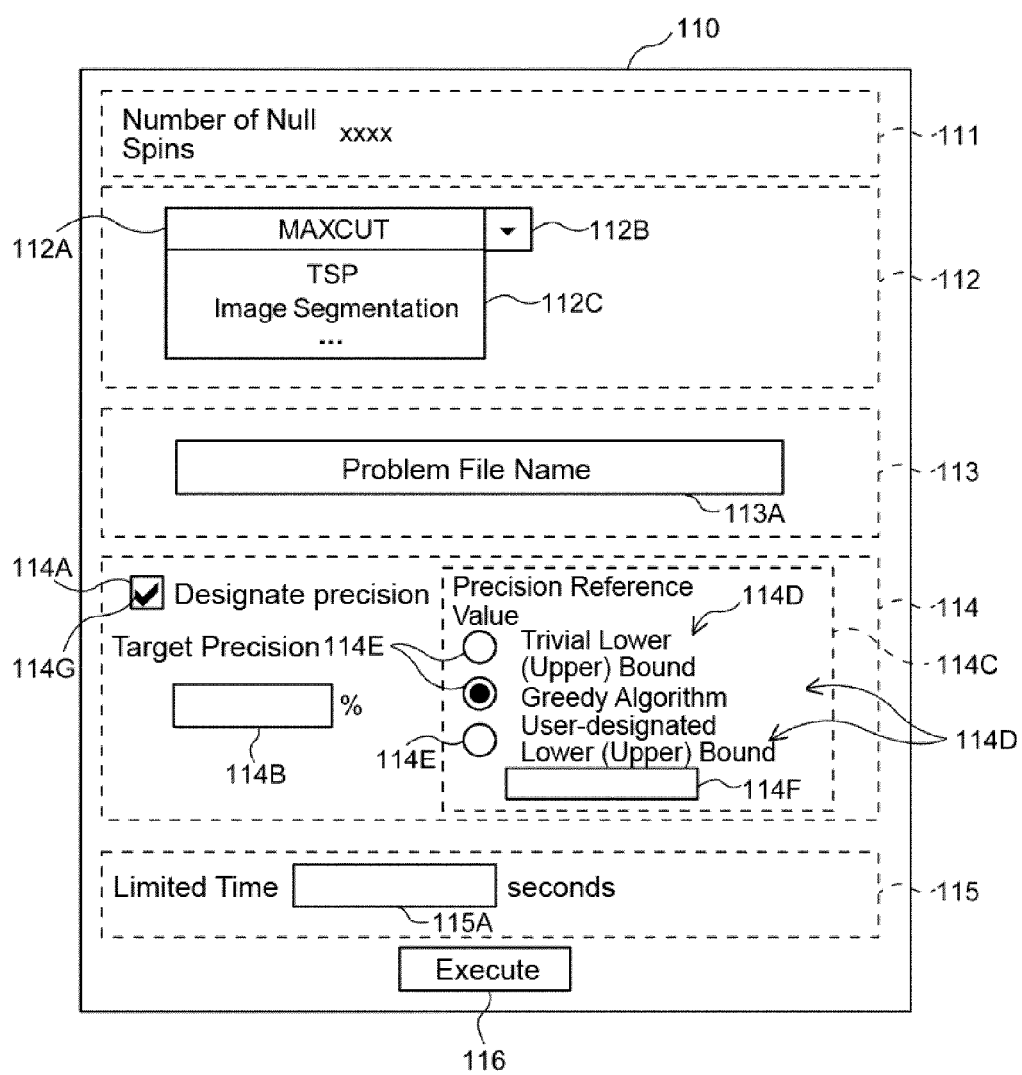
FIG. 20 is a schematic diagram illustrating an image configuration example of a problem input screen.

FIG. 20 shows a screen structure of a problem input screen 110 displayed on the display device 44 (FIG. 1) of the operation terminal 5 (FIG. 1) by specified operation at the information processing system according to this embodiment. This problem input screen 110 is a screen for the user to designate a problem to be solved by using an Ising model, and conditions upon solving the problem (solution precision and a time limit).

This problem input screen 110 is configured by including a system usage display area 111, a problem type designating area 112, a problem designating area 113, a solution precision designating area 114, a limited time designating area 115, and an execution button 116 as shown in FIG. 20.

Then, the system usage display area 111 is used to display the current number of null spins (the number of spins which are not currently used) as the usage of this information processing system 1.

Furthermore, the problem type designating area 112 is used to display a problem type designating field 112A and a pull-down button 112B. Then, the problem input screen 110 can display a pull-down menu 112C, in which type names of problems which can be solved by this information processing system (such as a combinatorial optimization problem ("MAXCUT"), a travelling salesman problem ("TSP"), and an image segmentation problem ("Image Segmentation")) are listed, by clicking a pull-down button 112B; and the type name of the problem to be solved at that time can be selected by clicking the relevant name from among the names displayed in the pull-down menu 112C. The then-selected problem type name is displayed in the problem type designating field 112A.

The problem designating area 113 is used to display a text box for inputting a file name of the problem definition file 94 (hereinafter referred to as the problem definition file name text box) 113A. Then, on the problem input screen 110, the relevant problem can be designated as a problem to be solved by the information processing system 1 at that time by the user inputting the file name of the problem definition file 94 (FIG. 18) for the problem prepared in advance into this problem file name text box 113A.

The solution precision designating area 114 is an area for the user to designate the solution precision, that is, at what degree of precision the problem whose file name of the problem definition file 94 is designated in the problem designating area 113 should be solved. This solution precision designating area 114 is used to display a check box 114A to select whether such solution precision should be designated or not, and a text box for inputting target solution precision (hereinafter referred to as the target precision) (hereinafter referred to as the target precision text box) 114B.

Furthermore, the solution precision designating area 114 is provided with an area for designating a reference value for the solution precision (hereinafter referred to as the solution precision reference value) (hereinafter referred to as the solution precision reference value designating area) 114C; and character strings 114D indicating some values, which can be solution precision reference value for this information processing system 1, and a plurality of toggle switches 114E associated with these character strings 114D are displayed in this solution precision reference value designating area 114C. In this embodiment, three character strings, that is, "trivial lower (upper) bound," "greedy algorithm," and "user-designated lower (upper) bound" are displayed as such character strings 114D. Furthermore, a text box 114F for the user to actually designate the solution precision reference value is displayed below the "user-designated lower (upper) bound."

Therefore, the user can: display a check mark 114G in a check box 114A by clicking the check box 114A; select a desired solution precision reference value in the solution precision reference value designating area 114C by clicking the toggle switch 114E corresponding to that solution precision reference value (however, in a case of "the user-designated lower (upper) bound," further inputting a desired solution precision reference value in a text box 114F); and designate desired solution precision by inputting that target precision in the target precision text box 114B. Also, the user can select to not designate the solution precision by not displaying the check mark 114G in the check box 114A.

The limited time designating area 115 is used to display a text box for the user to designate a time limit to obtain a solution (hereinafter referred to as the limited time text box 115A). Therefore, the user can designate a desired limited time by inputting the time limit in this limited time text box 115A.

Then, on the problem input screen 110, the data and the conditions (the solution precision and the limited time) of the problem definition file 94 designated by the user on the problem input screen 110 at that time can be sent from the operation terminal 5 to the administrative node 2 by designating the type of the problem to be solved at that time, the file name of the problem definition file 94 (problem file name), and the conditions (the solution precision and the time limit) as described above and then clicking the execution button 116. Consequently, the administrative node 2 which has received this problem definition file 94 and the conditions controls the host 3 (FIG. 1) to solve the problem defined in the relevant problem definition file 94 under the designated conditions.

Figure 21:
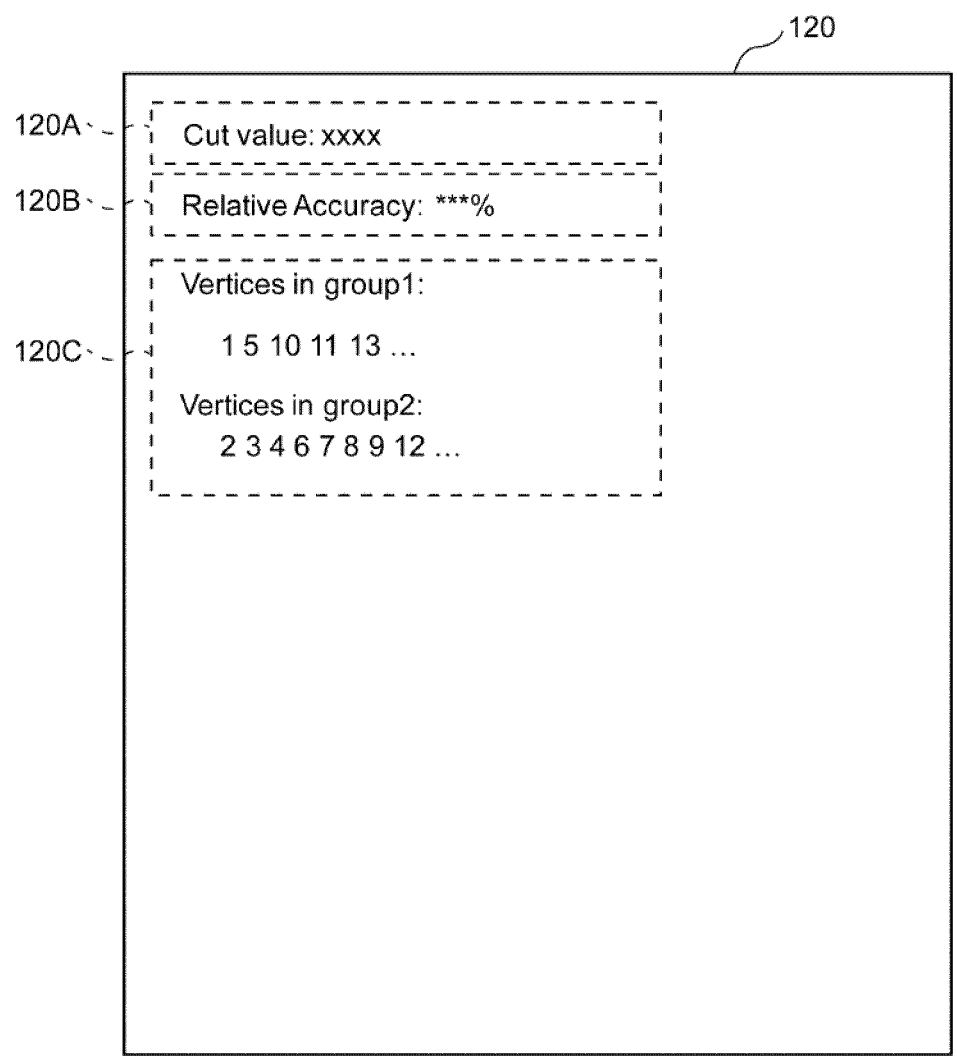
FIG. 21 is a schematic diagram of an image configuration example of a result presentation screen for a maximum cut problem.
Figure 22:
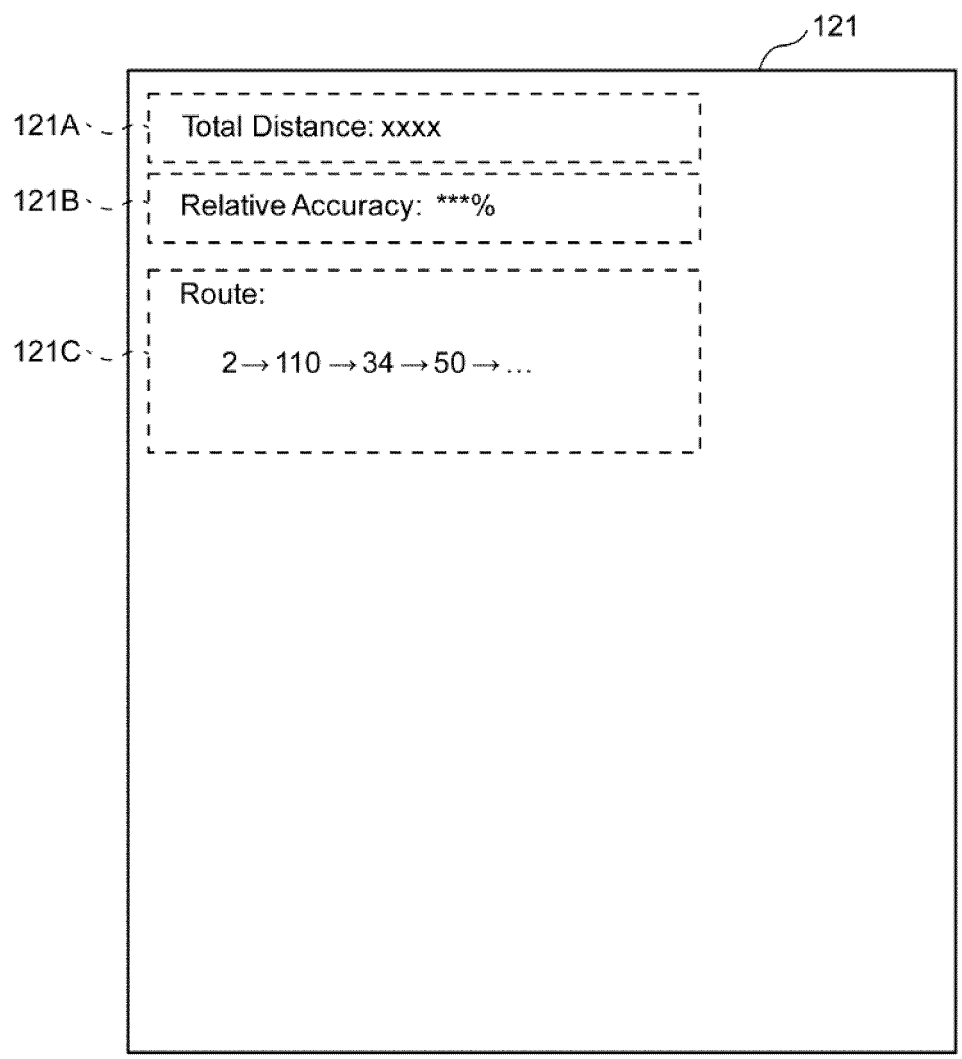
FIG. 22 is a schematic diagram of an image configuration example of a result presentation screen for a travelling salesman problem.
Figure 23:
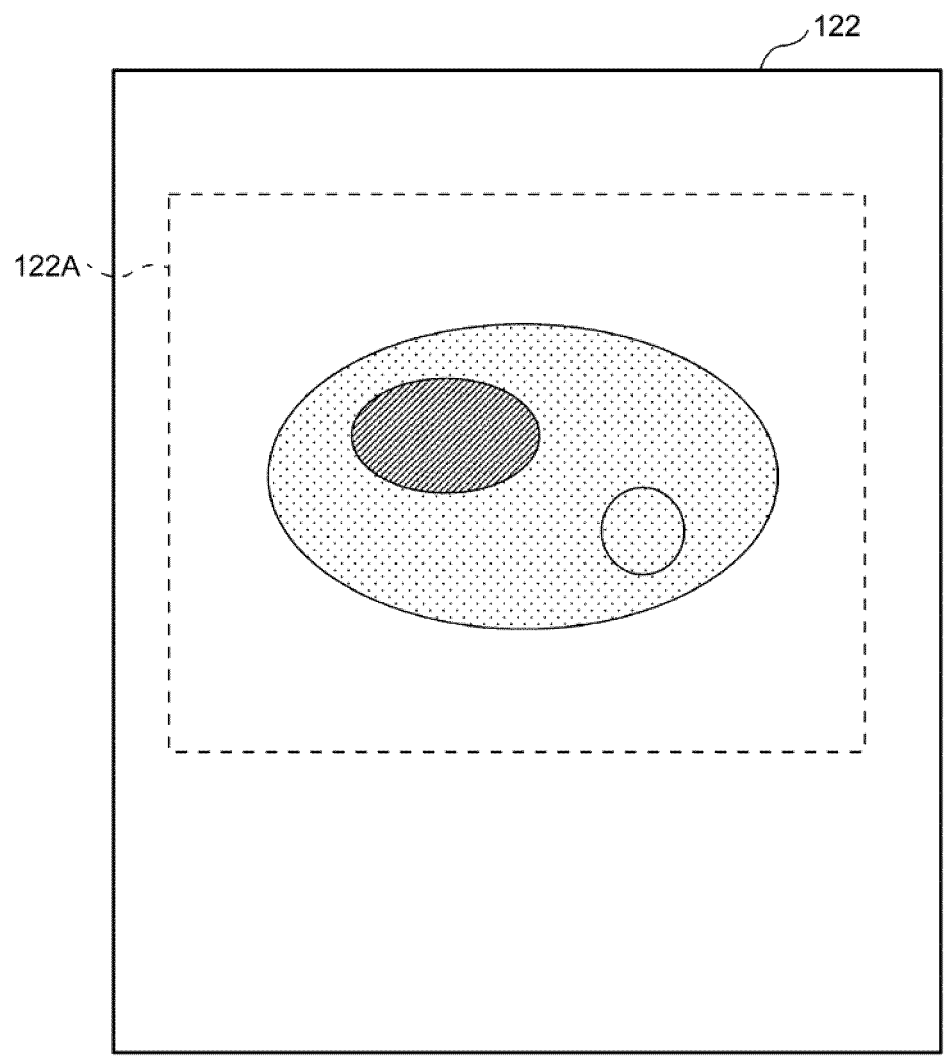
FIG. 23 is a schematic diagram illustrating an image configuration example of a result presentation screen for an image segmentation problem.

On the other hand, FIG. 21 to FIG. 23 show screen structures of the result presentation screens 120 to 122 displayed on the operation terminal 5. These result presentation screens 120 to 122 are screens used to present the results obtained by the ground-state search processing executed by this information processing system 1 as a result of the user's designating the problem and the conditions on the problem input screen 110 and clicking the execution button 116 as described above.

FIG. 21 is a screen example of the result presentation screen 120 when the problem designated on the problem input screen 110 is a designated combinatorial maximum cut problem ("MAXCUT"); and FIG. 22 is a screen example of the result presentation screen 121 when the problem is a travelling salesman problem ("TSP"). On each of these result presentation screens 120, 121, a solution evaluation index 120A, 121A, solution precision 120B, 121B for the reference value and a problem-specific optimization result 1200, 121C are displayed, respectively. Furthermore, FIG. 22 is a screen example of the result presentation screen 122 when the problem designated on the problem input screen 110 is an image segmentation problem ("Image Segmentation"). In this case, a problem-specific optimization result 122A is displayed as an image on the result presentation screen 122.

(1-4) Various Processing Executed by Information Processing System

Next, flows of various processing executed by this information processing system 1 will be explained. Incidentally, in the following explanation, a processing subject of various processing will be described as a program ("XXX unit") as necessary; however, needless to say, the CPU 11 (FIG. 1) for the administrative node 2 or the CPU 21 (FIG. 1) for the host 3 actually executes the processing based on that program.

(1-4-1) Basic Processing and Data Flow

Figure 24:
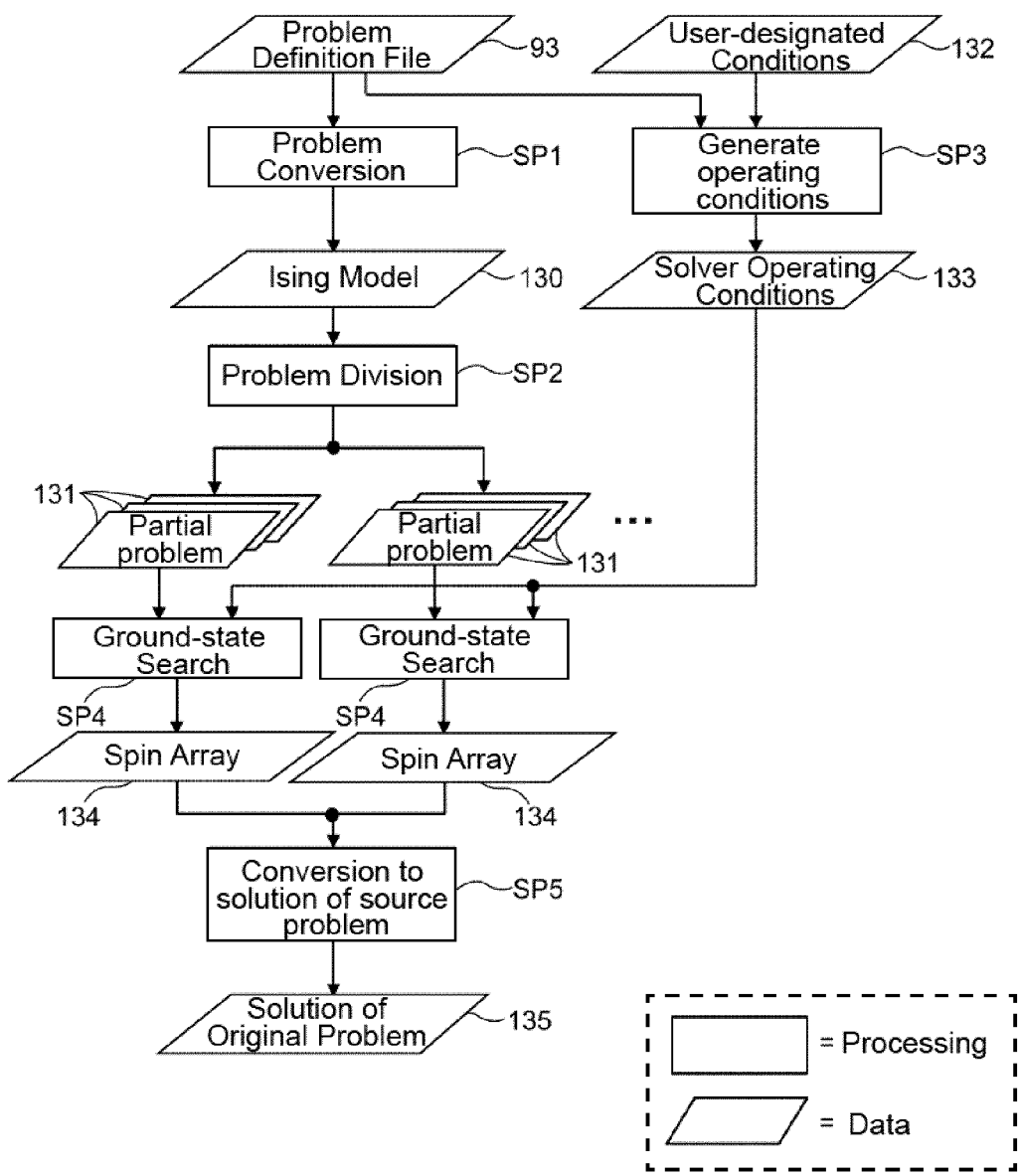
FIG. 24 is a flowchart illustrating basic processing and a flow of data relating to ground-state search processing.

FIG. 24 shows basic processing and a data flow relating to processing executed by this information processing system 1 for performing a ground-state search of an Ising model (hereinafter simply referred to as the ground-state search processing).

This information processing system 1 converts an original problem defined in the problem definition file 94 (FIG. 18)

into an Ising model 130 (SP1) and divides this Ising model 130 into partial problems 131 which are Ising models of a size that enables each host 3 to perform the ground-state search (SP2). Also, at the same time, the information processing system 1 generates the solver operating conditions 133 based on the conditions (the solution precision and the time limit) 132 designated by the user on the problem input screen 110 (FIG. 20), and the predefined solver operating conditions 87 (FIG. 15) (SP3).

Subsequently, the information processing system 1 sorts the partial problems 131 created as described above to each host 3 and each host 3 performs the ground-state search of the corresponding partial problem (SP4). The solution (the spin alignment) 134 obtained by this ground-state search is the solution of each corresponding partial problem. So, the solution 135 of the original problem is generated by integrating the solutions (spin alignment) of these partial problems (SP5).

(1-4-2) Ground-State Search Control Processing

Figure 25:
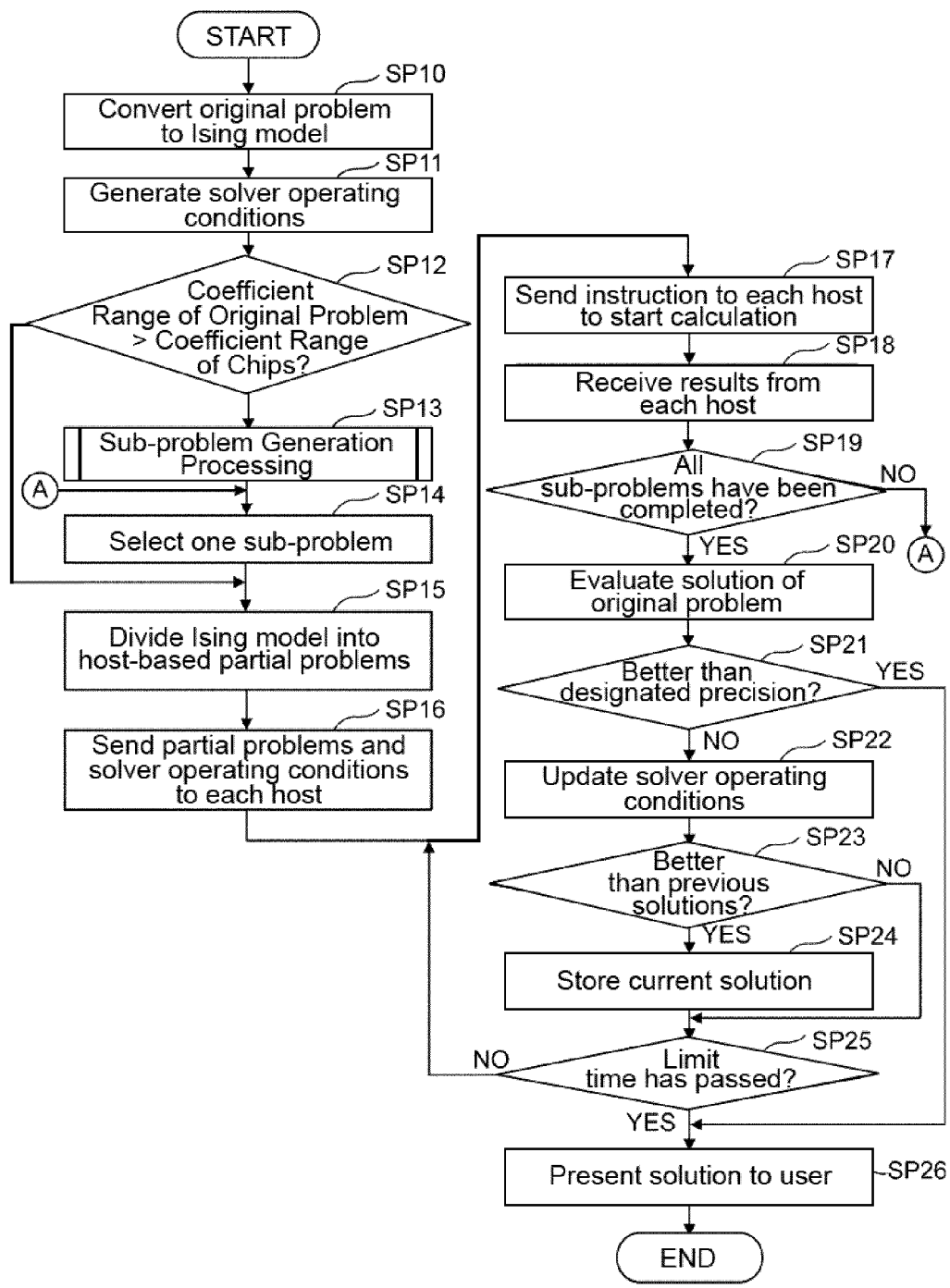
FIG. 25 is a flowchart illustrating a processing sequence for the ground-state search control processing according to the first embodiment.

FIG. 25 shows a flow of ground-state search control processing executed by the administrative node 2 in relation to the aforementioned ground-state search processing. This ground-state search control processing is started as the user designates the problem definition file 94 (FIG. 18) and the conditions (the solution precision and the time limit) on the problem input screen 110 described above with reference to FIG. 20 and clicks the execution button 116 (FIG. 20) and then, as a result, the problem definition file 94 and the conditions are sent from the operation terminal 5 to the administrative node 2.

At the administrative node 2 which has received the problem definition file 94 and the conditions, the problem conversion program 81 (FIG. 13) firstly converts the original problem into an Ising model of the data structure described earlier with reference to FIG. 19 (SP10).

Subsequently, the operating condition generation program 83 (FIG. 13) generates the solver operating conditions for the ground-state search processing to be executed at that time, based on the predefined solver operating conditions 87 (FIG. 15) and the conditions (the solution precision and the time limit) sent from the operation terminal 5 (SP11). Specifically speaking, when the required time for one ground-state search which is defined in the predefined solver operating conditions 87 is equal to or longer than the time limit designated by the user on the problem input screen 110, the operating condition generation program 83 generates the solver operating conditions obtained by reducing the number of repeats of interactions as defined in the predefined solver operating conditions 87 so that the required time for one ground-state search becomes shorter than the time limit.

Next, the problem division program 82 determines whether or not the coefficient range of the original problem is larger than the coefficient range which can be handled by the Ising chip 32 mounted on the Ising accelerator board 25 in each host 3 (SP12); and if the problem division program 82 obtains an affirmative result, the problem division program 82 executes sub-problem generation processing for generating a plurality of sub-problems from the original problem (SP13).

Subsequently, the problem division program 82 selects one sub-problem from the sub-problems generated in step SP13 (SP14). Furthermore, if the problem division program 82 obtains a negative result in step SP12, the problem division program 82 divides the original problem into partial problems on the basis of the hosts 3; and if the problem division program 82 obtains an affirmative result in step SP12, the problem division program 82 divides the sub-problem selected in step SP14 into partial problems on the basis of the hosts 3 (SP15).

Then, the Ising control program 84 (FIG. 13) sends the partial problems and the solver operating conditions to the respective necessary hosts 3 (SP16) and then sends a calculation start instruction to these hosts 3 (SP17). As a result, the ground-state search of the Ising model processing is started at each host 3 in response to this calculation start instruction; and then the processing result of this ground-state search processing is sent to the administrative node 2.

At the administrative node 2, the Ising control program 84 receives the processing result of the ground-state search processing sent from each host 3 as described above (SP18). Then, if the sub-problems are generated in step SP13, the Ising control program 84 determines whether the results of all the sub-problems (solutions of all the sub-problems) have been obtained or not (SP19). If the Ising control program 84 obtains a negative result in this determination, the Ising control program 84 returns the processing to step SP14 and then repeats the processing step SP14 to step SP19 until the Ising control program 84 obtains an affirmative result in step SP19.

If the Ising control program 84 eventually obtains an affirmative result in step SP19 by obtaining the solutions of all the sub-problems generated in step SP13, or if the sub-problems are not generated in the first place, the Ising control program 84 calculates the solution of the original problem by integrating the results of the ground-state search processing, which have been obtained as described above, from each host 3 and the solution quality evaluation program 85 (FIG. 13) evaluates the calculated solution of the original problem (SP20). Furthermore, the solution quality evaluation program 85 determines whether or not the evaluation result obtained in step SP20 is better than the solution precision designated by the user on the problem input screen 110 described earlier with reference to FIG. 20 (SP21).

Then, if the solution quality evaluation program 85 obtains an affirmative result in this determination, the UI program 80 (FIG. 13) has the operation terminal 5 display the result presentation screen 120 to 122 in the form described earlier with reference to FIG. 21 to FIG. 23 (SP26). As a result, this ground-state search control processing is terminated.

Figure 26:
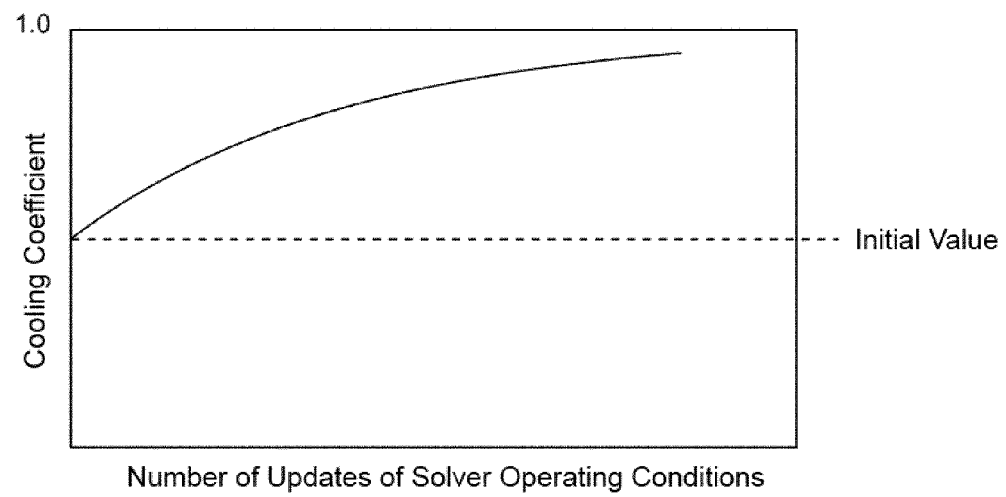
FIG. 26 is a characteristic curve diagram for explaining updates of solver operating conditions.
Figure 27:
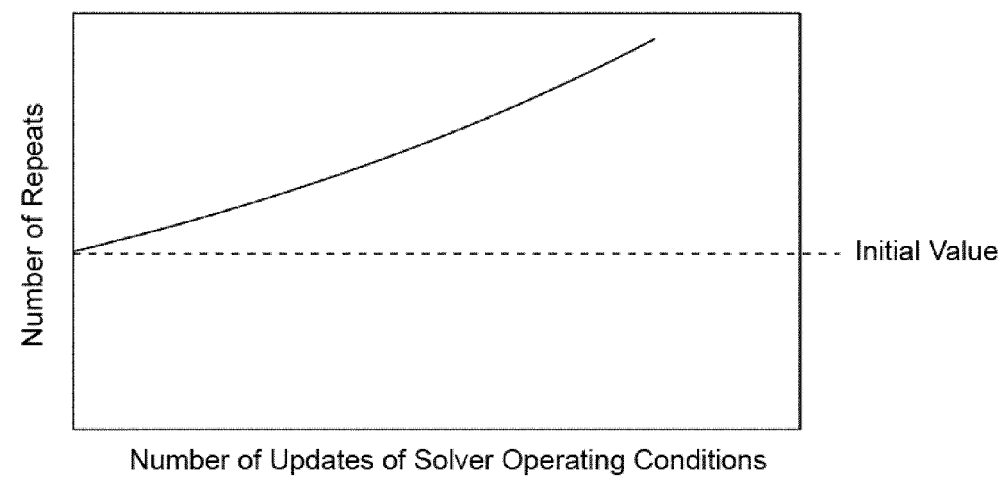
FIG. 27 is a characteristic curve diagram for explaining updates of solver operating conditions.

On the other hand, if the solution quality evaluation program 85 obtains a negative result in the determination in step SP21 the operating condition generation program 83 (FIG. 13) updates the solver operating conditions (SP22). Specifically speaking, the operating condition generation program 83 increases a cooling coefficient in the cooling scheduled described earlier with reference to FIG. 11 so that the cooling coefficient approaches asymptotically to 1 as shown in FIG. 26; and the operating condition generation program 83 also updates the solver operating conditions to increase the number of times of interactions which should be executed during one ground-state search as shown in FIG. 27. The closer to 1 the cooling coefficient for the cooling schedule is, the slower the reduction of the temperature becomes (that is, probability of spins to invert). So, by updating the solver operating conditions in this manner, it is possible to search for a larger number of spin-state combinations and, as a result, easily reach a good solution.

Subsequently, the solution quality evaluation program 85 determines whether the currently-obtained solution is better than solutions previously obtained or not, based on the evaluation result in step SP20 (SP23). Then, if the solution quality evaluation program 85 obtains a negative result in this determination, the solution quality evaluation program 85 proceeds to step SP25. On the other hand, if the solution quality evaluation program 85 obtains an affirmative result, the solution quality evaluation program 85 temporarily stores the current solution in the memory 12 (FIG. 1) (SP24) and then determines whether or not time elapsed from the start of this ground-state search control processing to the present has exceeded the limited time designated by the user (SP25).

If the solution quality evaluation program 85 obtains a negative result in this determination, the solution quality evaluation program 85 returns to the processing in step SP17 and then repeats the processing from step SP17 to step SP25. As a result, while the solution of the original problem solved in the memory 12 for the administrative node 2 is updated as necessary, the ground-state search processing is executed repeatedly at each host 3 and a solution of the best evaluation result among solutions of the original problem obtained by the ground-state search processing which has been executed repeatedly will be retained in the memory 12 for the administrative node 2.

Then, if the solution quality evaluation program 85 obtains an affirmative result in SP25 as the time elapsed from the start of this ground-state search control processing exceeds the time limit designated by the user, the UI program 80 sends the solution of the original problem which is stored in the memory 12 at that time to the operation terminal 5 and thereby has the result presentation screen 120 to 122 in the form described earlier with reference to FIG. 21 to FIG. 23 displayed on the display device 44 (FIG. 1) for the operation terminal 5 (SP26). Subsequently, this ground-state search control processing is terminated.

Figure 28:
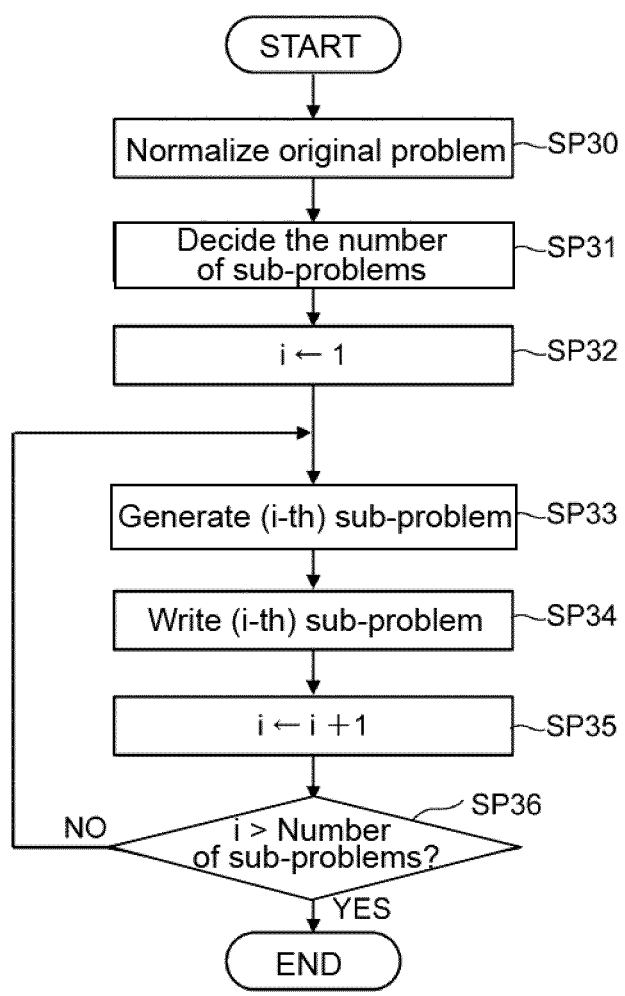
FIG. 28 is a flowchart illustrating a processing sequence for sub-problem generation processing.

(1-4-3) Sub-Problem Generation Processing
(1-4-3-1) Sub-Problem Generation Processing FIG. 28 illustrates sub-problem generation processing executed by the problem division program 82 (FIG. 13) in step SP13 of the aforementioned ground-state search control processing (FIG. 25). The problem division program 82 generates a plurality of sub-problems in accordance with the processing sequence illustrated in this FIG. 28.

In the following explanation, the interaction coefficients from the i-th spin to the j-th spin in the original problem obtained in step SP10 of the ground-state search control processing will be hereinafter referred to as "$J_{i,j}$ of the original problem" and the external magnetic field coefficient of the i-th spin will be hereinafter referred to as "$h_i$ of the original problem" as necessary.

When the problem division program 82 proceeds to step SP13 of the ground-state search control processing, the problem division program 82 starts the sub-problem generation processing shown in FIG. 28 and firstly normalizes $J_{i,j}$ of the original problem and $h_j$ of the original problem (SP30). The interaction coefficients and the external magnetic field coefficients of the original problem include various values, but the coefficients are normalized to −1 to +1 by dividing all the coefficients by a coefficient whose absolute value is maximum among both the interaction coefficients and the external magnetic field coefficients (hereinafter referred to as the coefficient depth). Incidentally, the interaction coefficients and the external magnetic field coefficients may be normalized separately. In this case, regarding the interaction coefficients, the interaction coefficient whose absolute value is maximum is defined as the coefficient depth and each interaction coefficient is divided by the coefficient depth and thereby normalized; and regarding the external magnetic field coefficients, the external magnetic field coefficient whose absolute value is maximum is defined as the coefficient depth and each external magnetic field coefficient is divided by the coefficient depth and is thereby normalized.

Subsequently, the problem division program 82 decides the quantity of the sub-problems to be generated (SP31). The quantity of the sub-problem is decided in consideration of the fact that there is a trade-off relationship between the quantity of sub-problems and computational complexity and computational precision. Specifically speaking, as the quantity of sub-problems is increased, the possibility of obtaining a solution with higher degree of approximation (close to a global optimal solution) increases; however, it is necessary to perform ground-state searches of many sub-problems, so the computational complexity increases. It is necessary to decide the quantity of sub-problems based on a processing speed of the ground-state search by the information processing system 1, restricted time caused in terms of applications, and required solution precision. Generally, the quantity of sub-problems required to find a solution with the same degree of approximation tends to increase in proportion to the size of the problems (the number of spins, the number of interactions, and the number of external magnetic fields) and the coefficient depth found in step S30.

Then, the problem division program 82 executes processing for generating sub-problems in step SP32 to SP36 as many times as the quantity of sub-problems decided in step SP31. In practice, the problem division program 82: firstly sets variable i to 1 (SP32); decides the interaction coefficient and external magnetic field coefficient of a sub-problem for the i-th spin which is the same value as variable I (SP33); and writes them as the sub-problem data (SP34). Furthermore, step S607, the problem division program 82 updates variable i to a value increased by 1 (SP35); and determines whether the value of variable i is larger than the number of sub-problems or not (SP36). If the value of variable i is smaller than the number of sub-problems, the problem division program 82 returns to step SP33 and then repeats the processing in steps SP33 to SP36 until the value of variable i becomes larger than the number of sub-problems.

Step SP32, step SP35 and step SP36 are a loop for executing step SP33 to step SP34 as many times as the quantity of sub-problems. However, since this loop does not have any dependency on the steps immediately before or after it within that loop, the loop can be easily expanded and executed in parallel in the computer environment where parallel execution is possible. Specifically speaking, if the computer environment with sufficient parallelism exists, the generation of the sub-problems can be executed within constant time regardless of the quantity of sub-problems and has scalability even for large-scale problems.

(1-4-3-2) Sub-Problem Interaction Coefficient Generation Processing

Figure 29:
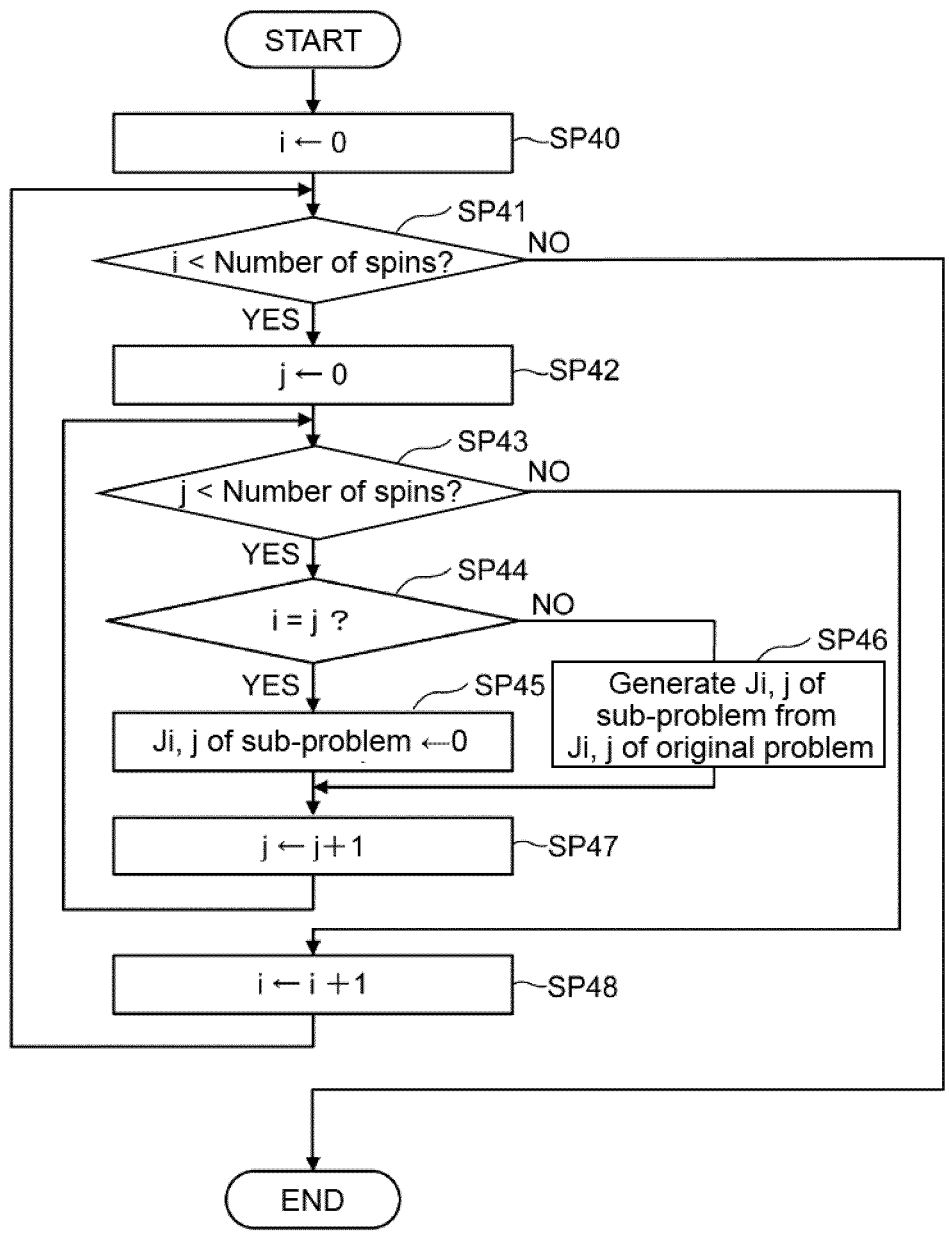
FIG. 29 is a flowchart illustrating a processing sequence for sub-problem interaction coefficient generation processing.

FIG. 29 illustrates the processing content of the sub-problem interaction coefficient generation processing executed by the problem division program 82 in step SP33 of the aforementioned sub-problem generation processing. The problem division program 82 generates an interaction coefficient of a sub-problem from the interaction coefficient of the original problem after the normalization in accordance with the processing sequence shown in this FIG. 29.

In practice, when the problem division program 82 proceeds to step SP33 of the sub-problem generation processing, the problem division program 82 starts the interaction coefficient generation processing shown in this FIG. 29, firstly initializes variable i corresponding to the i-th spin (sets variable i to 0) (SP40), and then determines whether the value of variable i is smaller than the total number of spins or not (SP41). Then, if the problem division program 82 obtains an affirmative result in this determination, the problem division program 82 initializes variable j corresponding to the j-th spin (SP42) and then determines whether the value of variable j is smaller than the total number of spins or not (SP43).

If the problem division program 82 obtains an affirmative result in this determination, the problem division program 82 determines whether the variable i and the variable j are the same value or not (SP44). Then, if the problem division program 82 obtains an affirmative result in this determination, the problem division program 82 sets the interaction coefficient $J_{i,j}$ from the i-th spin to the j-th spin of the sub-problem to 0 (SP45). On the other hand, if the problem division program 82 obtains a negative result in this determination, the problem division program 82 generates the interaction coefficient $J_{i,j}$ of the sub-problem from the interaction coefficient $J_{i,j}$ of the original problem (SP46). Then, the problem division program 82 increases the value of variable j by 1 (SP47).

Subsequently, the problem division program 82 returns to step SP43 and then repeats the processing in step SP43 and subsequent steps. Then, if the problem division program 82 eventually obtains a negative result in step SP43 by completing the execution of the processing from step SP43 to step SP47 on all the spins, the problem division program 82 increases the value of variable i by 1 (SP48), then returns to step SP41, and repeats the processing in step SP41 and subsequent steps.

Then, if the problem division program 82 eventually obtains a negative result in step SP41 by completing the execution of the processing from step SP41 to step SP48 on all the spins, the problem division program 82 terminates this sub-problem interaction coefficient generation processing.

During the above-described sub-problem interaction coefficient generation processing (FIG. 29) when the interaction coefficients $J_{i,j}$ are aligned like a matrix on a two-dimensional plane, these steps SP40 to SP48 operate to sequentially scan the matrix from its end. Incidentally, it should be noted that since the variable for the outer loop is i and the variable for the inner loop is j and if certain i and j are given and i>j is satisfied, j and i have already passed (already processed).

The interaction exists only between two mutually different spins. So, as the interaction coefficients are sequentially scanned, there should be no interaction coefficient which satisfies i=j (for example, $J_{1,1}$). Therefore, the interaction coefficient which satisfies i=j in steps SP44 and step SP45 as described above is set to 0. Regarding other combinations of i and j, $J_{i,j}$ of the sub-problem is generated from $J_{i,j}$ of the original problem in step SP46.

Figure 30:
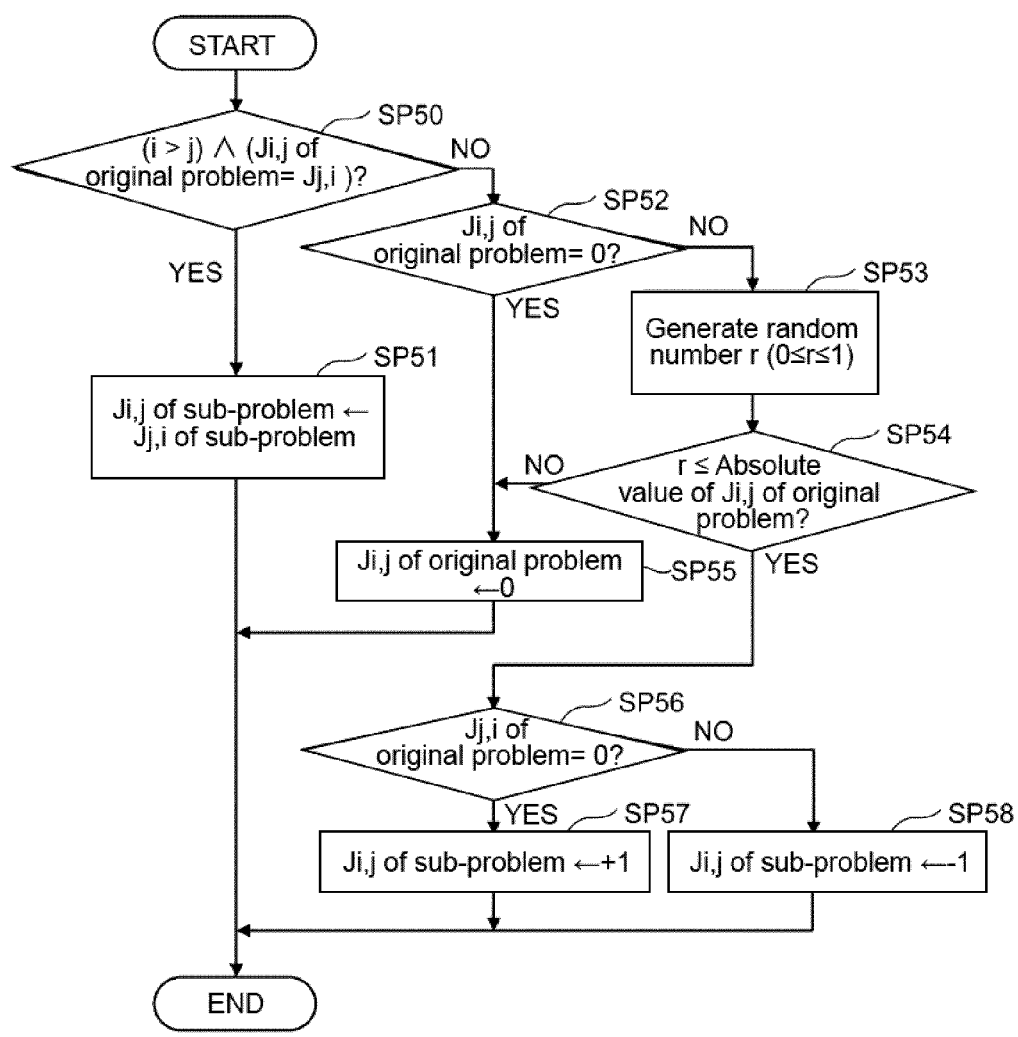
FIG. 30 is a flowchart illustrating a processing sequence for partial processing in the sub-problem interaction coefficient generation processing.

Incidentally, FIG. 30 shows an example of specific processing in step SP46 of the sub-problem interaction coefficient generation processing. This FIG. 30 shows a processing sequence when interaction coefficients of sub-problems are generated to simulate positive coefficients as +1/0 and to simulate negative coefficients as −1/0 among the interaction coefficients of the original problem.

In practice, in step SP46 of the sub-problem interaction coefficient generation processing, the problem division program 82 determines whether $J_{i,j}$ of the original problem designated with the given variables i and j is given as a directed graph or as an edge of an undirected graph (undirected edge) (SP50). If $J_{i,j}$ of the original problem and $J_{j,i}$ are the same value ($J_{i,j}=J_{j,i}$), the problem division program 82 determines that $J_{i,j}$ of the original problem designated with the given variables i and j is the undirected edge. Incidentally, in a case of an edge of the directed graph (directed edge), an interaction from the i-th spin to the j-th spin is different from an interaction from the j-th spin to the i-th spin or only either one of them exists, so that $J_{i,j}$ of the original problem and $J_{j,i}$ are different values ($J_{i,j} \neq J_{j,i}$).

In steps step SP53 to step SP58 of the processing in FIG. 30, +1 or −1 is generated as the coefficient of the sub-problem with probability in proportion to the size of $J_{i,j}$ of the original problem. Since a random number is used under this circumstance, $J_{i,j}$ and $J_{j,i}$ of the sub-problem do not necessarily become the same value. If the original problem is a directed edge and $J_{i,j}$ and $J_{j,i}$ of the original problem are originally different values, it is inevitable that $J_{i,j}$ and $J_{j,i}$ of the sub-problem are different. However, if the original problem is an undirected edge, $J_{i,j}$ and $J_{j,i}$ of the sub-problem should become the save value.

Then, if the problem division program 82 obtains an affirmative result in step SP50, this means that the processing for generating $J_{j,i}$ of the sub-problem from $J_{j,i}$ of the original problem has already been completed (if i>j is satisfied, the combination of j and i has already passed), the problem division program 82 outputs the already generated value of $J_{j,i}$ of the sub-problem as the value of $J_{i,j}$ of the sub-problem (SP51) and then terminates this processing of FIG. 30.

On the other hand, if the problem division program 82 obtains a negative result in step SP50 (if $J_{i,j}$ of the original problem designated with the given variables i and j is not the undirected edge or if $J_{i,j}$ of the original problem designated with the given variables i and j is the undirected edge, but it is the first time to generate the coefficient of the sub-problem), the problem division program 82 executes the following processing from step SP52 to step SP58.

Specifically speaking, the problem division program 82 determines whether $J_{j,i}$ of the original problem is 0 or not (SP52). Then, if the problem division program 82 obtains an affirmative result in this determination, the problem division program 82 also sets $J_{j,i}$ of the sub-problem to 0 (SP55) and then terminates this processing of FIG. 30.

Specifically speaking, if the problem division program 82 obtains a negative result in the determination in step SP52, the problem division program 82 executes processing in step SP53 to step SP58 for setting, as $J_{j,i}$ of the sub-problem: +1 or 0 if $J_{j,i}$ of the original problem is positive with probability according to the size of the value of $J_{j,i}$ of the original problem; or −1 or 0 if $J_{j,i}$ of the original problem is negative.

Specifically speaking, the problem division program 82 generates a random number r having a range from 0 to 1 (SP53) and then determines whether or not the random number r generated in step SP53 is equal to or less than an absolute number of $J_{j,i}$ of the original problem (SP54).

Then, if the problem division program 82 obtains a negative result in this determination, the problem division program 82 sets $J_{j,i}$ of the sub-problem to 0 (SP55) and then terminates this processing.

On the other hand, if the problem division program 82 obtains an affirmative result in the determination in step SP54, the problem division program 82 determines whether $J_{j,i}$ of the sub-problem is a positive value or not (SP56). If the problem division program 82 obtains an affirmative result in this determination, the problem division program 82 sets $J_{j,i}$ of the sub-problem to +1 (SP57). On the other hand, if the problem division program 82 obtains a negative result in this determination, the problem division program 82 sets $J_{j,i}$ of the sub-problem to −1 (SP58) and then terminates this processing.

In this way, the interaction coefficient of the sub-problem which is +1/0 or −1/0 can be generated at the probability in proportion to the size of the coefficient of the original problem.

The above-described algorithm can generate the interaction coefficient of the sub-problem by simulating a positive coefficient, among the interaction coefficients of the original problem, as +1/0 and simulating a negative coefficient as −1/0. Incidentally, this method can be described as assigning the value of +1/0/−1 to $J_{j,i}$ of the sub-problem so that an expected value or average value of an interaction coefficient ($J_{j,i}$ of the sub-problem) of each edge of the plurality of generated sub-problems becomes a value of $J_{j,i}$ of the normalized original problem.

(1-4-3-3) Sub-Problem External Magnetic Field Coefficient Generation Processing

Figure 31:
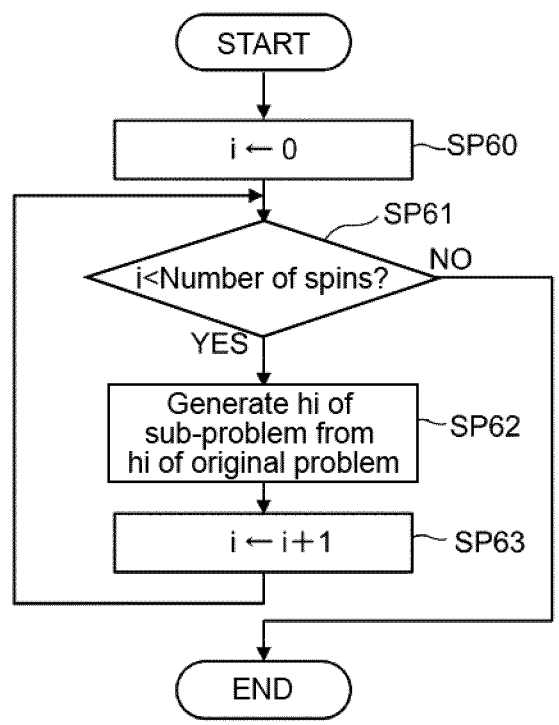
FIG. 31 is a flowchart illustrating a processing sequence for sub-problem external magnetic field coefficient generation processing.

On the other hand, FIG. 31 illustrates the processing content of sub-problem external magnetic field coefficient generation processing executed by the problem division program 82 before and after the aforementioned sub-problem interaction coefficient generation processing (FIG. 29) or in parallel with the sub-problem interaction coefficient generation processing in step SP33 of the aforementioned sub-problem generation processing (FIG. 28). The problem division program 82 generates the external magnetic field coefficient of the sub-problem from the external magnetic field coefficient of the original problem (the Ising model) after the normalization in accordance with the processing sequence shown in FIG. 31.

In practice, when the problem division program 82 starts this sub-problem external magnetic field coefficient generation processing, it firstly sets variable i, which represents the spin number, to 0 (SP60) and then determines whether the value of variable i is smaller than the total number of spins or not (SP61).

If the problem division program 82 obtains an affirmative result in this determination, generates $h_i$ of the sub-problem from h of the original problem (SP62), updates the value of variable i to a value obtained by adding 1 to the value of variable i (SP63), and then returns to step SP61. Then, the problem division program 82 repeats the processing from step SP61 to step SP63 until the value of variable i becomes larger than the total number of spins.

Then, when the value of variable i eventually becomes larger than the total number of spins, the problem division program 82 terminates this sub-problem external magnetic field coefficient generation processing.

Figure 32:
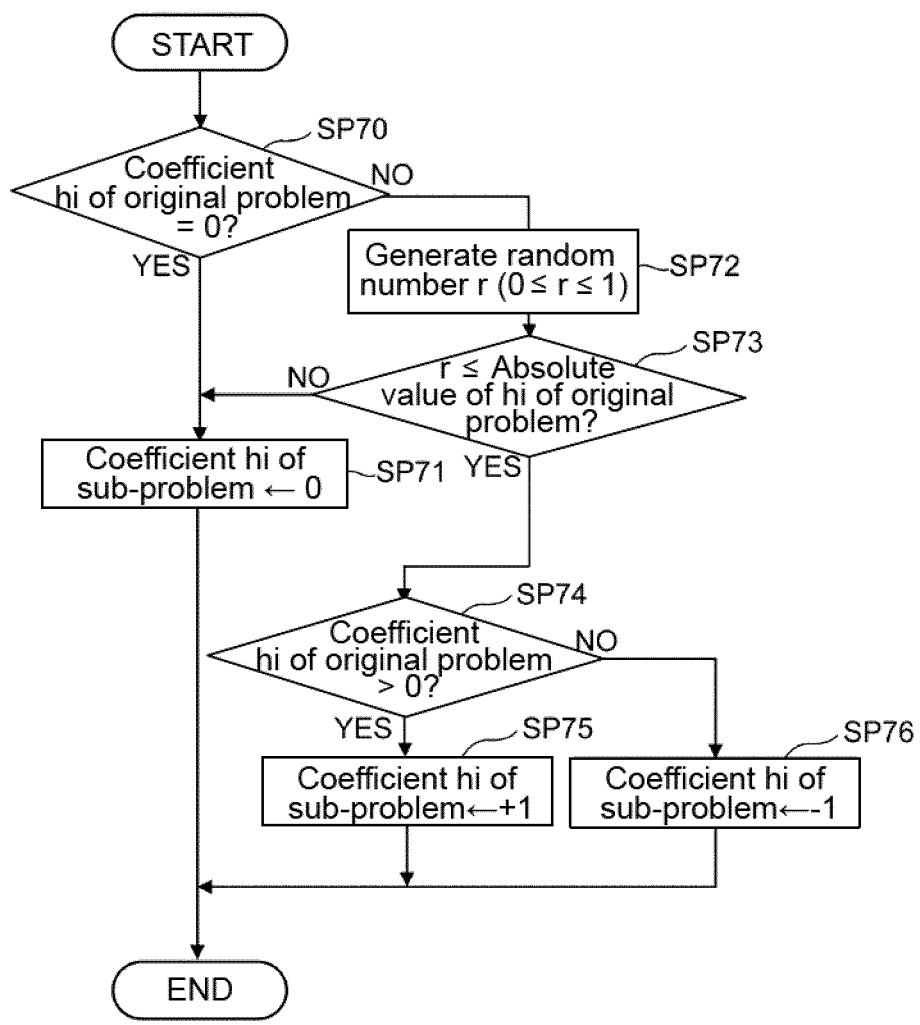
FIG. 32 is a flowchart illustrating a processing sequence for partial processing in the sub-problem external magnetic field coefficient generation processing.

Incidentally, FIG. 32 shows an example of processing in step SP62. FIG. 32 illustrates a processing sequence when coefficients of sub-problems are generated to simulate positive coefficients as +1/0 and to simulate negative coefficients as −1/0 among the external magnetic field coefficients of the original problem.

In practice, when the problem division program 82 proceeds to step SP62 of the sub-problem external magnetic field coefficient generation processing, the problem division program 82 firstly determines whether $h_i$ of the original problem is 0 or not (SP70). Then, if the problem division program 82 obtains an affirmative result in this determination, the problem division program 82 also sets $h_i$ of the sub-problem to 0 (SP71) and then terminates this processing.

On the other hand, if the problem division program 82 obtains a negative result in the determination of step SP70, the problem division program 82 executes processing in step SP72 to step SP76 for setting, as $h_i$ of the sub-problem: +1 or 0 if $h_i$ of the original problem is positive with probability according to the size of the value of $h_i$ of the original problem; or −1 or 0 if $h_i$ of the original problem is negative.

Specifically speaking, the problem division program 82 generates a random number r having a range from 0 to 1 (SP72) and then determines whether or not the random number r generated in step SP53 is equal to or less than an absolute value of $h_i$ of the original problem (SP73).

Then, if the problem division program 82 obtains a negative result in this determination, the problem division program 82 sets $h_i$ of the sub-problem to 0 (SP71) and then terminates this processing.

On the other hand, if the problem division program 82 obtains an affirmative result in the determination in step SP73, the problem division program 82 determines whether $h_i$ of the original problem is a positive value or not (SP74). If the problem division program 82 obtains an affirmative result in this determination, the problem division program 82 sets $h_i$ of the sub-problem to +1 (SP75). On the other hand, if the problem division program 82 obtains a negative result in this determination, the problem division program 82 sets $h_i$ of the sub-problem to −1 (SP76) and then terminates this processing.

In this way, the external magnetic field coefficient of the sub-problem which is +1/0 or −1/0 can be generated at the probability in proportion to the size of the external magnetic field coefficient of the original problem.

The above-described algorithm can generate the external magnetic field coefficient of the sub-problem by simulating a positive coefficient, among the external magnetic field coefficients of the original problem, as +1/0 and simulating a negative coefficient as −1/0. Incidentally, this method can be described as assigning the value of +1/0/−1 to $h_i$ of the sub-problem so that an expected value or average value of an external magnetic field coefficient ($h_i$ of the sub-problem) of each edge of the plurality of generated sub-problems becomes a value of $h_i$ of the normalized original problem.

(1-4-4) Ising Accelerator Board Control Processing

Figure 33:
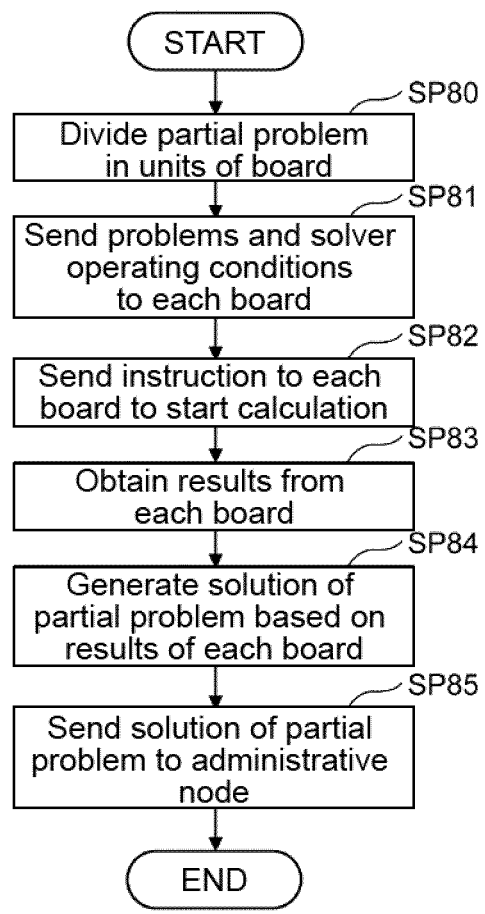
FIG. 33 is a flowchart illustrating a processing sequence for Ising accelerator board control processing.

FIG. 33 illustrates Ising accelerator board control processing executed by the board control program 90 (FIG. 13) of the host 3 which has received the partial problems and the solver operating conditions, which were sent from the administrative node 2 in step SP16 of the ground-state search control processing described earlier with reference to FIG. 25, and the above-described calculation start instruction.

When the board control program 90 receives the partial problems, the solver operating conditions, and the aforementioned calculation start instruction which are sent from the administrative node 2, the board control program 90 starts the Ising accelerator board control processing shown in this FIG. 33 and firstly divides the partial problems, which are supplied from the administrative node 2, corresponding to the respective Ising accelerator boards 25 (SP80). Incidentally, each problem obtained by dividing the partial problems will be hereinafter referred to as the divided partial problem.

Subsequently, the board control program 90 sends each corresponding divided partial problem and the solver operating conditions, which are supplied from the administrative node 2 at that time, to each Ising accelerator board 25 (SP81) and then issues an instruction to each Ising accelerator board 25 to execute calculation of the divided partial problem (hereinafter referred to as the calculation execution instruction) (SP82).

Next, the board control program 90 reads the processing result of the calculation processing executed according to the calculation execution instruction from each Ising accelerator board 25 (SP83) and generates a solution of the corresponding partial problem by integrating the read calculation results of the respective Ising accelerator boards 25 (SP84). Then, the board control program 90 sends the thus generated solution of the partial problem to the administrative node 2 (SP85) and then terminates this Ising accelerator board control processing.

(1-4-5) Ising Chip Control Processing

Figure 34:
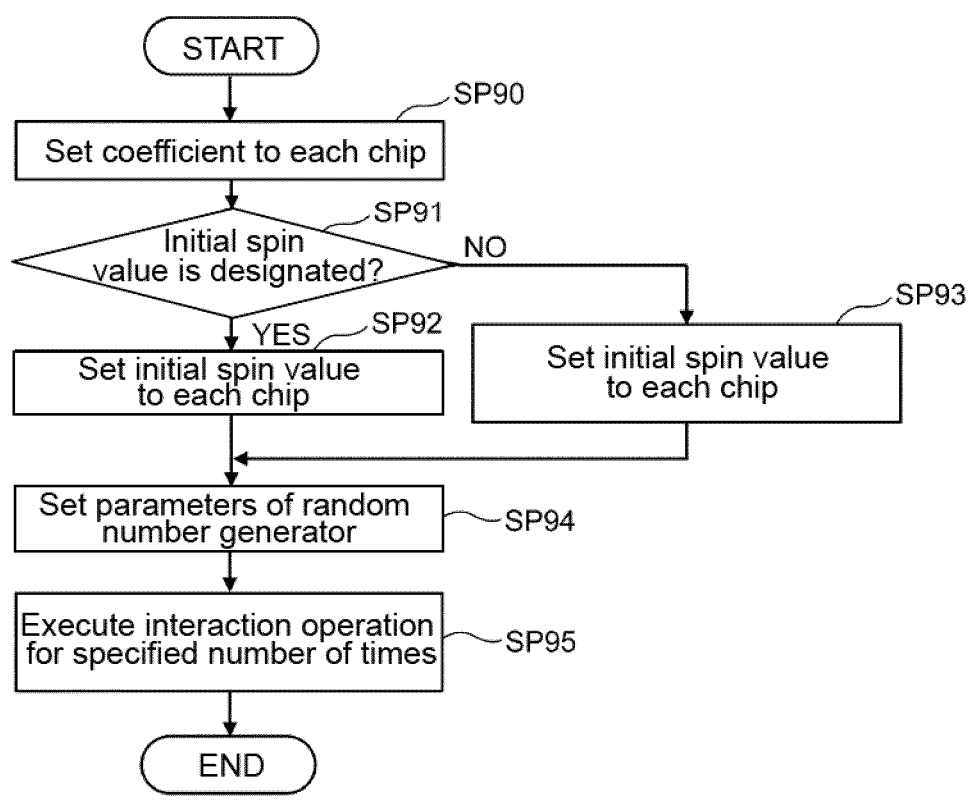
FIG. 34 is a flowchart illustrating a processing sequence for Ising chip control processing.

On the other hand, FIG. 34 illustrates a processing sequence for Ising chip control processing executed by the controller 30 (FIG. 2) for the Ising accelerator board 25 which has received the calculation execution instruction sent from the board control program 90 in step SP82 of the Ising accelerator board control processing described above with reference to FIG. 33.

After receiving the calculation execution instruction from the board control program 90, the controller 30 firstly starts the Ising chip control processing shown in FIG. 34 and sets a coefficient according to the divided partial problem given from the board control program 90 to each Ising chip 32 mounted on the present Ising accelerator board (SP90).

Subsequently, the controller 30 determines whether an initial spin value is designated or not, by referring to the solver operating conditions given from the board control program 90 (SP91). Then, if the controller 30 obtains an affirmative result in this determination, the controller 30 sets the designated initial spin value to each of the Ising chips 32 (SP92) and then proceeds to step SP94.

On the other hand, if the controller 30 obtains a negative result in the determination of step SP91, the controller 30 generates a plurality of random spin values according to the corresponding divided partial problem and sets each of the generated spin values to each Ising chip 32 (SP93).

Subsequently, the controller 30 sets parameters for the cooling schedule according to the solver operating conditions supplied from the board control program 90 to each random number generator 33 (FIG. 2) (SP94) and then controls each Ising chip 32 to executes the interaction operation as many times as the number of repeats designated in the solver operating conditions (SP95). Then, after completing the execution of the interaction operation as many times as the number of repeats designated in the solver operating conditions, the controller 30 reads the spin alignment in each Ising chip 32 at that time, sends it to the CPU 21 (FIG. 1) for the host 21, and then terminates this Ising chip control processing.

(1-4-6) Chip Boundary Interaction Calculation Processing

Figure 35:
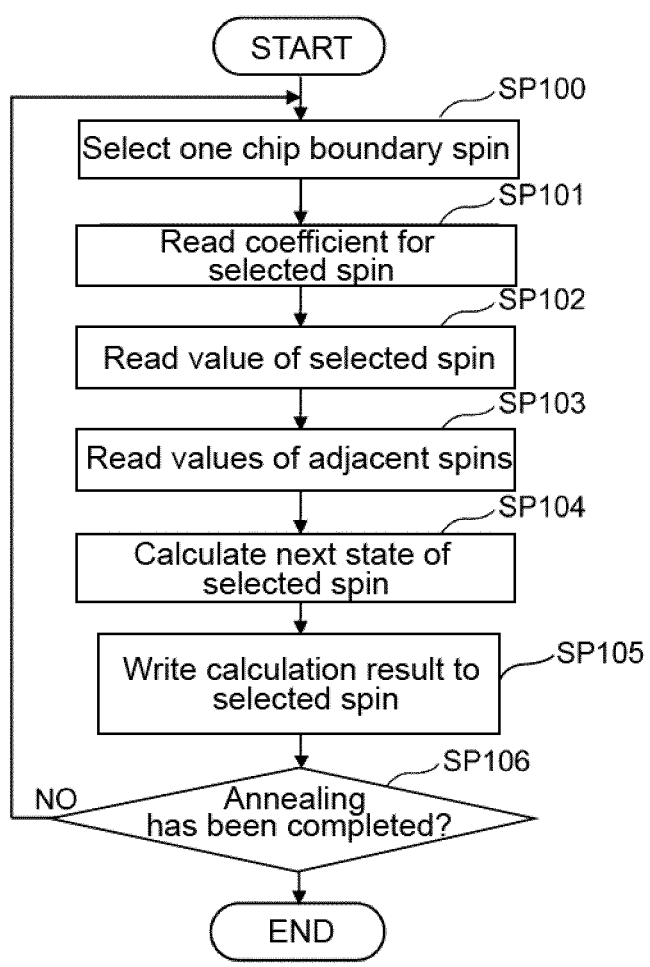
FIG. 35 is a flowchart illustrating a processing sequence for chip boundary interaction calculation processing.

FIG. 35 illustrates chip boundary interaction calculation processing executed by the Ising control program 84 (FIG. 13) of the administrative node 2 as necessary, while the ground-state search is executed at the Ising accelerator board 25, in order to find the ground state with good precision.

When solving a problem of a size that does not fit in a single Ising chip 32 on the Ising accelerator board 25 in each host 3 as mentioned above, this information processing system 1 divides the problem into a plurality of Ising chips 32 and perform the ground-state search independently at each Ising chip 32.

However, if such a method is used, interactions cannot be executed with respect to spins whose values are retained by the respective spin units 70 at the outermost periphery of the spin units 70 arranged in a lattice form in the Ising chip 32 as shown in FIG. 9 (hereinafter referred to as the chip boundary spins) because their adjacent spin values are retained by the spin units 70 in another Ising chip 32 in the Ising model described earlier with reference to FIG. 4. As a result, the problem is that the information processing system 1 as a whole cannot perform the ground-state search of the then-targeted Ising model with good precision.

So, with this information processing system 1, the Ising control program 84 (FIG. 13) for the administrative node 2 executes chip boundary interaction calculation processing, as necessary, for reading each spin value on the chip boundary with respect to each Ising accelerator board 25 in accordance with the processing sequence illustrated in FIG. 35, performing the interaction calculation, and writing back the calculation result to each Ising chip 32.

In practice, after completing the interactions at the Ising accelerator board 25 as many times as a specified number of times, the Ising control program 84 starts the chip boundary interaction calculation processing illustrated in this FIG. 35, firstly selects one spin from the chip boundary spins (SP100), and reads values of the interaction coefficients and the external magnetic field coefficients of the selected spin (hereinafter referred to as the selected spin) from the corresponding Ising chip 32 (SP101).

Subsequently, the Ising control program 84 reads the selected spin value from the corresponding Ising chip 32 (SP102) and values of respective spins adjacent to the selected spin in the spin model described earlier with reference to FIG. 4 (hereinafter referred to as the adjacent spins) from the corresponding Ising chip 32 (SP103).

Next, the Ising control program 84 calculates the next state (0 or 1) of the selected spin based on the interaction coefficients and the external magnetic field coefficients of the selected spin, which are obtained in step SP101, the selected spin value obtained in step SP102, and the respective adjacent spin values of the selected spin, which are obtained in step SP103 (SP104).

Furthermore, the Ising control program 84 writes the calculation result of step SP104 to the memory cell N (see FIG. 7) of the corresponding sin unit 70 of the corresponding Ising chip 32 (S105P) and then determines whether the execution of the same processing (from step SP101 to step SP105) on all the chip boundary spins existing in this Ising accelerator board 25 has been completed or not (SP106).

Then, if the Ising control program 84 obtains a negative result in this determination, the Ising control program 84 returns to step SP100 and then repeats the processing from step SP100 to step SP106 while sequentially switching the spin to be selected in step SP100 to another chip boundary spin which has not been processed.

Then, if the Ising control program 84 eventually obtains an affirmative result in SP106 by completing the execution of the processing from step SP101 to step SP105 on all the chip boundary spins existing in the Ising accelerator board 25, the Ising control program 84 terminates this chip boundary interaction calculation processing.

Incidentally, reading of each coefficient (the interaction coefficients and the external magnetic field coefficients) and the spin values from the Ising chip 32 by the Ising control program 84 from step SP101 to step SP103 and writing of the spin values to the Ising chip 32 by the Ising control program 84 in step SP105 can be performed by SRAM access.

(1-5) API Mounted on Operation Terminal

Figure 36:
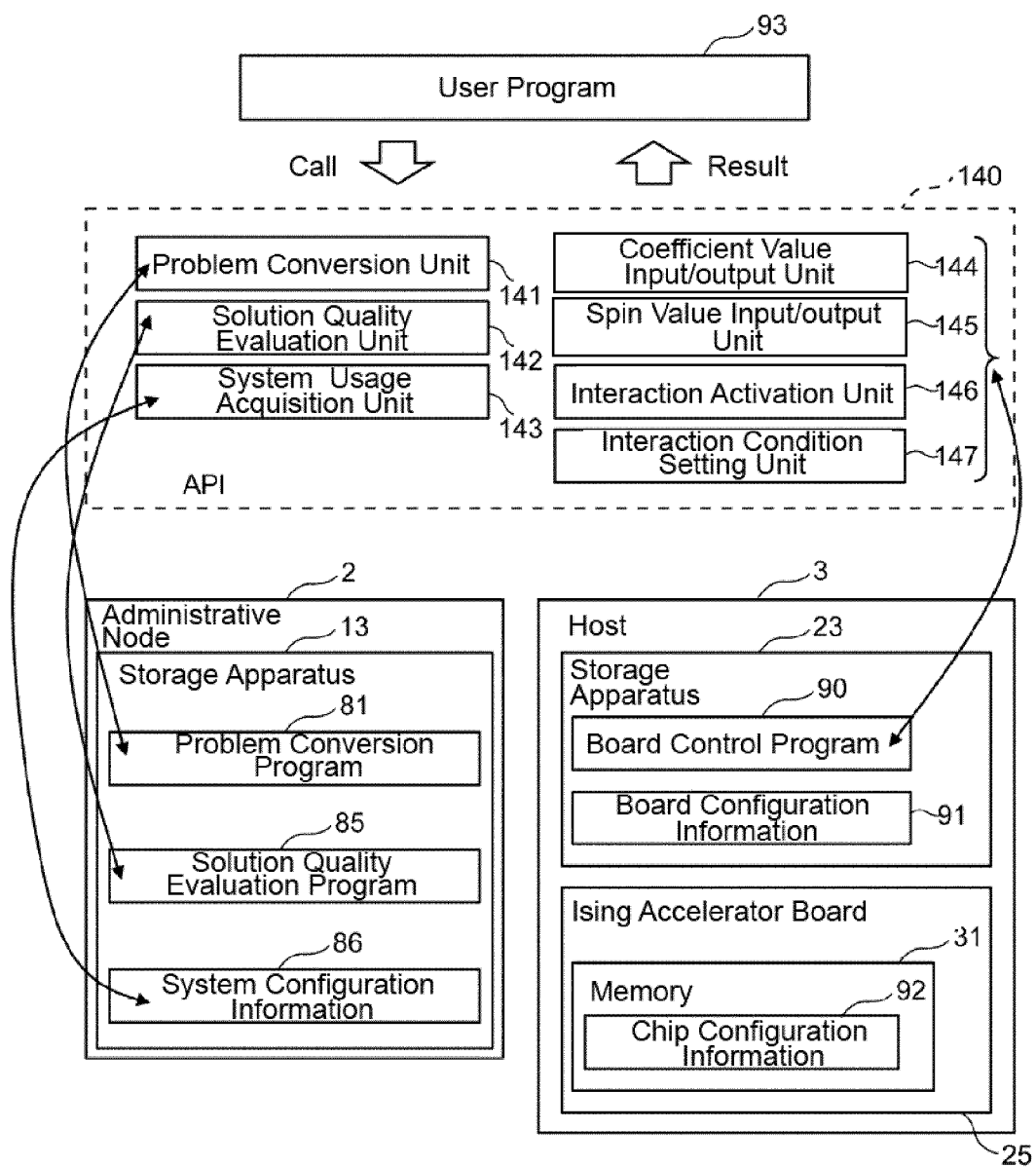
FIG. 36 is a block diagram for explaining an API mounted in an operation terminal.

FIG. 36 shows the configuration of an API (Application Programming Interface) 140 mounted on the operation terminal 5 of the information processing system 1 according to this embodiment. The operation terminal 5 includes, as the API 140 for the user program 93 to exchange various commands and information with the administrative node 2 and the host 3, a problem conversion unit 141, a solution quality evaluation unit 142, a system usage acquisition unit 143, a coefficient value input/output unit 144, a spin value input/output unit 145, an interaction activation unit 146, and an interaction condition setting unit 148 as shown in this FIG. 36.

The problem conversion unit 141 is a thread having a function that transmits the problem type and the problem definition file, which are designated by the user using the problem input screen 110 described earlier with reference to FIG. 20 and other means, to the problem conversion program 81 of the administrative node 2; and the solution quality evaluation unit 142 is a thread having a function that acquires the solution evaluation index 120A, 121A and the solution precision 120B, 121B for the reference value, which should be displayed on the result presentation screen described earlier with reference to FIG. 21 and FIG. 22 and other specified screen, from the solution quality evaluation program 85 of the administrative node 2. Furthermore, the system usage acquisition unit 143 is a thread having a function that acquires the usage of this information processing system 1, which is displayed on the system usage display area 111 (FIG. 20) of the problem input screen 110 or other specified screen, from the system configuration information 86 of the administrative node 2.

On the other hand, the coefficient value input/output unit 144 and the spin value input/output unit 145 are threads having a function that transmits the coefficients (the interaction coefficient and the external magnetic field coefficient) and the spin values of the Ising model via the administrative node 2 to the board control program 90 of the host 3 when these coefficients and spin values are designated by the user using a specified input screen.

Furthermore, for example, when the execution button 116 (FIG. 20) of the problem input screen 110 is clicked or an instruction to start the ground-state search of the Ising model processing is given from the user by other specified operation, the interaction activation unit 146 is a thread having a function that reports this to the board control program 90 of the host 3 via the administrative node 2. Furthermore, the interaction condition setting unit 147 is a thread having a function that transmits the conditions upon execution of the interactions including at least the solution precision and the time limit, which are designated by the user by using the problem input screen 110 or other screens, to the board control program 90 of the host 3 via the administrative node 2.

(1-6) Advantageous Effects of this Embodiment

With the information processing system 1 according to this embodiment as described above, the user can designate the problem and the conditions for solving the problem (the solution precision and the time limit) on the problem input screen 110 (FIG. 20) and each host 3 performs the ground-state search of the Ising model of the problem under the control of the administrative node 2 according to the conditions.

Accordingly, if this information processing system 1 is used, it is possible to obtain a solution of the problem designated by the user under the conditions desired by the user by using the Ising chip 32 and thereby implement a highly-convenient information processing system.

Figure 37:
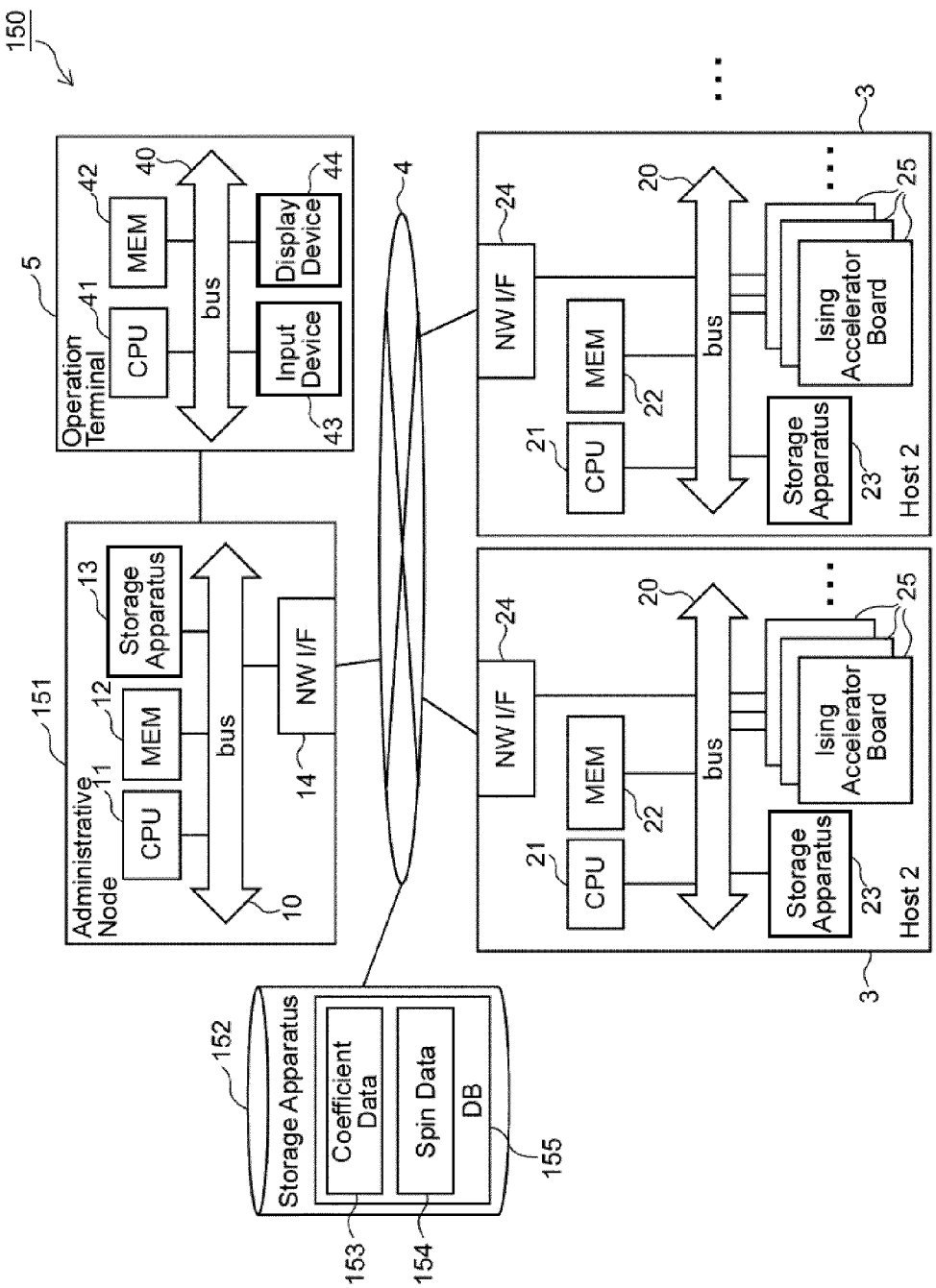
FIG. 37 is a block diagram illustrating an overall configuration of an information processing system according to a second embodiment.

(2) Second Embodiment (2-1) Configuration of Information Processing System According to this Embodiment FIG. 37 in which parts corresponding to those in FIG. 1 are assigned the same reference numerals as those in FIG. 1 shows an information processing system 150 according to a second embodiment. This information processing system 150 is configured in the same manner as the information processing system 1 according to the first embodiment, except that the information processing system 150 has a function that solves a new problem by using solutions of problems which were solved previously.

In practice, in a case of the information processing system 150 according to this embodiment, the network 4 is connected to a storage apparatus 152 in addition to an administrative node 151 and a plurality of hosts 3. This storage apparatus 152 is composed of, for example, a dedicated server apparatus equipped with a RAID (Redundant Arrays of Inexpensive Disks), hard disk drives, or SSDs. Then, the storage apparatus 152 stores a database (hereinafter referred to as the previous problem database) 155 in which respective coefficient (interaction coefficients and external magnetic field coefficients) and solutions (spin alignments) of problems which were solved previously by this information processing system 150 are registered as coefficient data 153 and spin data 154, respectively.

Meanwhile, when a new problem is input, a Ising control program 156 (FIG. 13) mounted in the administrative node 151 searches the previous problem database 155 for a problem whose form is close to an Ising model of the new problem. Then, if the Ising control program 156 detects such a problem (the problem solved previously) through the search, the Ising control program 156 sets a solution (spin alignment) of that problem registered in the previous problem database 155 as an initial spin alignment of the new problem.

Now, if the solution of the previous problem, whose form is close to the Ising model of the newly input problem, is set as the initial spin alignment of the new problem, it is assumed that the Ising model of the new problem is in a state close to the ground state at the initial stage. On the other hand, if the initial temperature of the cooling schedule described earlier with reference to FIG. 11 is high, spins frequently invert at the beginning of the ground-state search, so that there is a possibility that the state of the Ising model of the new problem might change away from the ground state.

Figure 38:
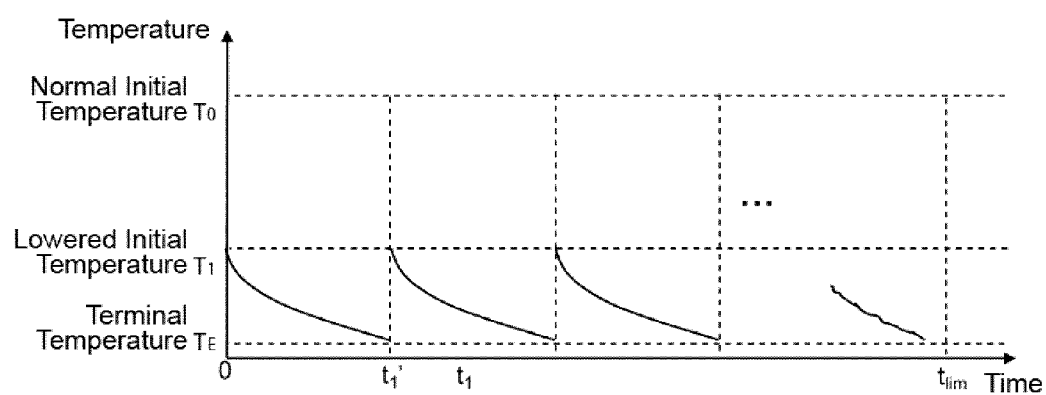
FIG. 38 is a characteristic curve diagram for explaining a cooling schedule according to the second embodiment.

Therefore, when this information processing system 150 sets the solution of the previous problem, whose form is close to the Ising model of the newly input problem, as the initial spin alignment of the new problem, the Ising control program 156 decreases the initial temperature of the cooling schedule to a temperature of the degree that allows the solution precision to be achieved, in accordance with the solution precision designated by the user on the problem input screen 110 described earlier with reference to FIG. 20 as shown in FIG. 38 and updates the solver operating conditions to reduce the number of repeats of the interaction operation during one ground-state search. As a result, this information processing system 150 can find the solution of the new problem promptly and with good precision.

Figure 39:
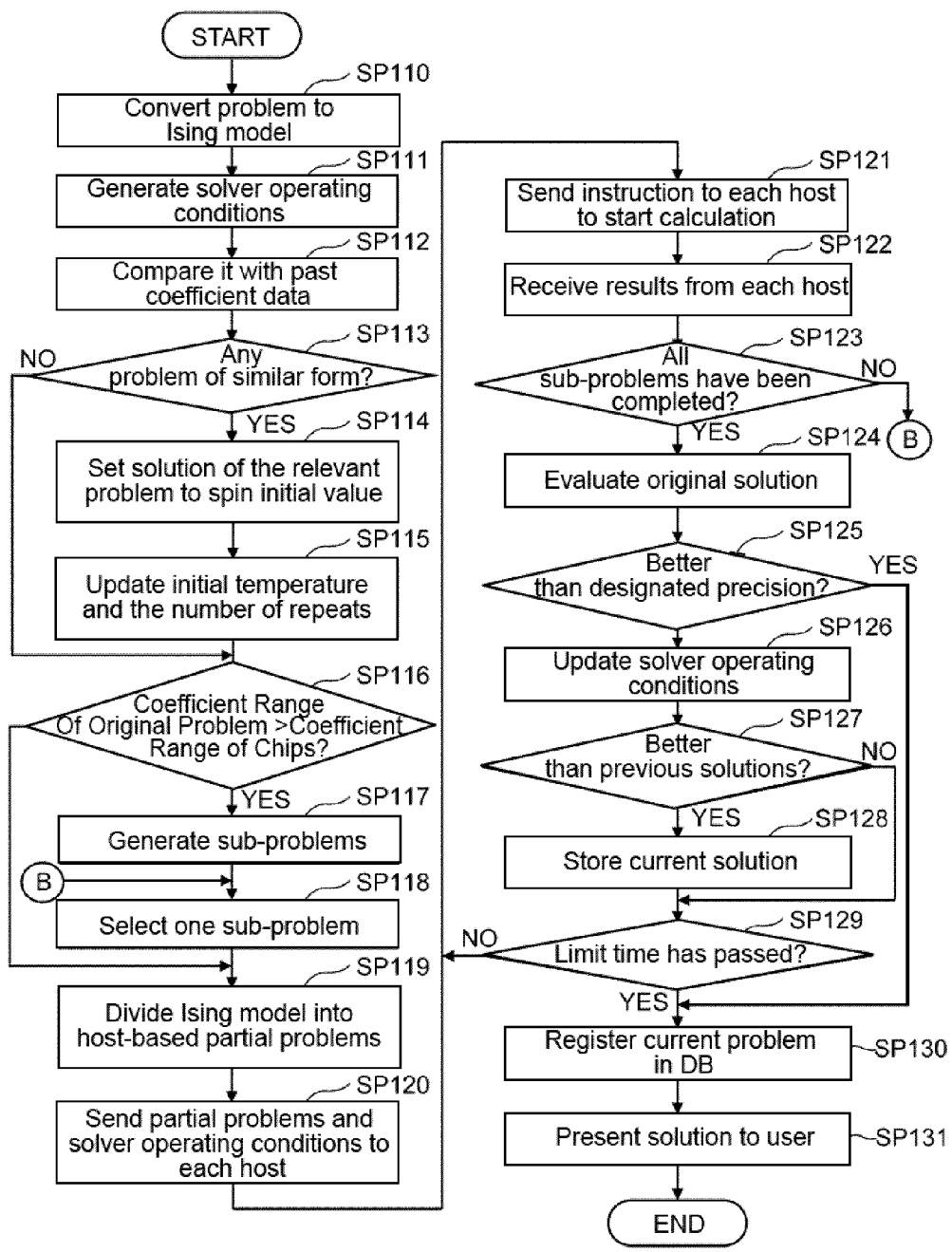
FIG. 39 is a flowchart illustrating a processing sequence for ground-state search control processing according to the second embodiment.

FIG. 39 illustrates a flow of ground-state search control processing according to this embodiment, that is executed by the administrative node 151 in relation to the ground-state search processing at the information processing system 150 according to this embodiment. This ground-state search control processing is started as the user designates the problem definition file 94 and the conditions (the solution precision and the time limit) on the problem input screen 110 (FIG. 20) and clicks the execution button 116 and, as a result, data of the problem definition file 94 and the conditions are reported from the operation terminal 5 to the administrative node 151.

At the administrative node 151 which has received such information, the processing in step SP110 and step SP111 is executed in the same manner as in step SP10 and step SP11 of the ground-state search processing according to the first embodiment as described earlier with reference to FIG. 25.

Subsequently, the Ising control program 156 compares coefficient values of the Ising model of each previous problem stored in the previous problem database 155 with coefficient values of the Ising model of the new problem obtained in step SP110 (SP112) and determines, based on the comparison result, whether or not any problem of the Ising model whose form is close to the Ising model of the new problem exists among the previous problems (SP113).

Specifically speaking, in step SP112, the Ising control program 156 firstly determines whether or not any Ising model regarding which the difference between the number of vertexes and the number of coefficients of that Ising model and the number of vertexes and the number of coefficients of the Ising model of the new problem is equal to or less than a predetermined threshold value exists in the respective previous problems whose coefficient data 153 and so on are registered in the previous problem database 155. Then, if such a problem exists among the respective previous problems, the Ising control program 156 further performs isomorphism determination of the Ising model of that previous problem and the Ising model of the current problem and then determines, based on the result of the isomorphism determination, whether or not any problem of the Ising model whose form is close to the Ising model of the new problem exists among the previous problems.

Then, if the Ising control program 156 obtains a negative result in step SP113, the Ising control program 156 returns to the processing in step SP116. Meanwhile, if the Ising control program 156 obtains an affirmative result in step SP113, the Ising control program 156 reads a solution (spin alignment) of the problem, whose Ising model is determined to be the closest among the previous problems to the Ising model of the new problem, from the previous problem database 155 and sets the read solution as the initial spin value of the Ising model of the new problem (SP114).

At the same time, the Ising control program 156 decreases the initial temperature of the cooling schedule to a value corresponding to the solution precision designated by the user on the problem input screen 110 (FIG. 20) and updates the solver operating conditions generated in step SP111 to decrease the number of repeats of the interaction operation during the ground-state search (SP115).

Subsequently, the administrative node 151 executes the processing from step SP116 to step SP129 in the same manner as from step SP12 to step SP25 of the ground-state search control processing according to the first embodiment as described earlier with reference to FIG. 25. As a result, the interactions are executed at the host 3 of the information processing system 150.

Subsequently, the Ising control program 156 stores the coefficient of the Ising model obtained by conversion of the current problem, and the solution of the current problem (spin alignment) obtained by the processing before and in step SP129 as the coefficient data 153 and the spin data 154 of the current problem in the storage apparatus 152 (FIG. 37) (SP130).

Then, the UI program 80 displays the result presentation screens 120 to 122 in the forms described earlier with reference to FIG. 21 to FIG. 23 on the operation terminal 5 (SP131). As a result, this ground-state search control processing is terminated.

The information processing system 150 according to this embodiment is designed as described above so that solutions of a newly introduced problem and a previous problem whose Ising model is close are set as an initial spin alignment of a new problem; and at the same time, an initial temperature of a cooling schedule included in solver operating conditions is decreased to a temperature according to solution precision designated by the user; and the solver operating conditions are updated to reduce the number of repeats of interaction operation during one ground-state search. So, in addition to the advantageous effects obtained by the information processing system 1 according to the first embodiment, the advantageous effect of being capable of finding a new problem promptly and with good precision can be obtained.

(3) Other Embodiments

Incidentally, the aforementioned first and second embodiments have described the case where the present invention is applied to the information processing system that finds a solution of a problem by searching for a ground state of an Ising model; however, the present invention is not limited to this example and can be applied to a wide variety of information processing systems that find a solution of a problem by simulating interactions between nodes of an interaction model other than an Ising model. With such an information processing system, the semiconductor chip that simulates interactions between nodes of the interaction model can be configured in the same manner as the multi-Ising chip 6 in the first and second embodiments described earlier with reference to FIG. 1 to FIG. 27. In this case, if there is no bias for each node, a memory cell pair ISx which retains a coefficient of that bias (hereinafter referred to as the bias coefficient) can be omitted from element units; and if such a bias exists, such a bias coefficient, instead of the external magnetic field coefficient, may be retained in the memory cell pair ISx.

Furthermore, the aforementioned first and second embodiments have described the case where the host 3 is equipped with the function as a host unit equipped with one or more Ising chips 32 for executing the ground-state search of the Ising model, the operation terminal 5 is equipped with the function as an operation unit that provides the user interface for the user to designate the problem, and the administrative node 2 is equipped with the function as a management unit that converts the problem designated by the user using the user interface into an Ising model and controls the host unit to have the Ising chip 32 search for the ground state of the converted Ising model; however, the present invention is not limited to this example and one apparatus may be equipped with these functions as the host unit, the operation unit and the management unit.

Furthermore, the aforementioned first and second embodiments have described the case where as the method of getting out of the local optimal solution upon the ground-state search as described with reference to FIG. 10, a random number is supplied to each spin unit 70 of the Ising chip 32 and spin values retained by these spin units 70 are thereby stochastically inverted; however, the present invention is not limited to this example and other wide variety of methods can be applied.

For example, it is possible to apply a method of intentionally inducing a bit error by decreasing the voltage of power supply to the Ising chip 32 in order to implement necessary operation to get out of the local optimal solution by directly utilizing randomness of semiconductors. Specifically speaking, since the voltage supplied to the memory cells of each spin unit 70 is inversely proportional to a bit error rate are, it may be possible to get out of the local optimal solution by stochastically inducing the bit error by decreasing the voltage supplied to each spin unit 70.

Figure 2:
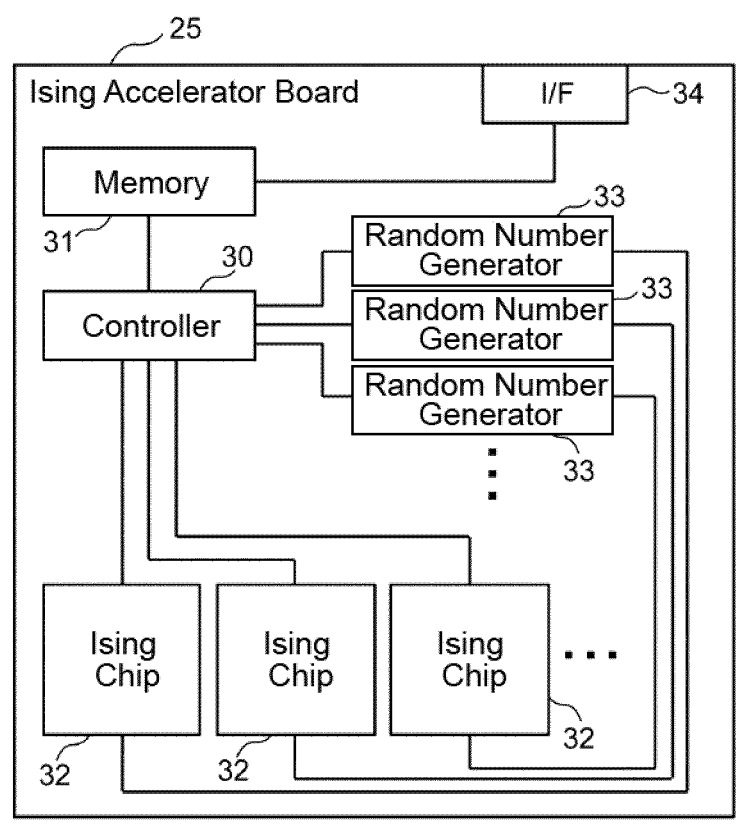
FIG. 2 is a block diagram illustrating the configuration of an Ising accelerator board.
Figure 40:
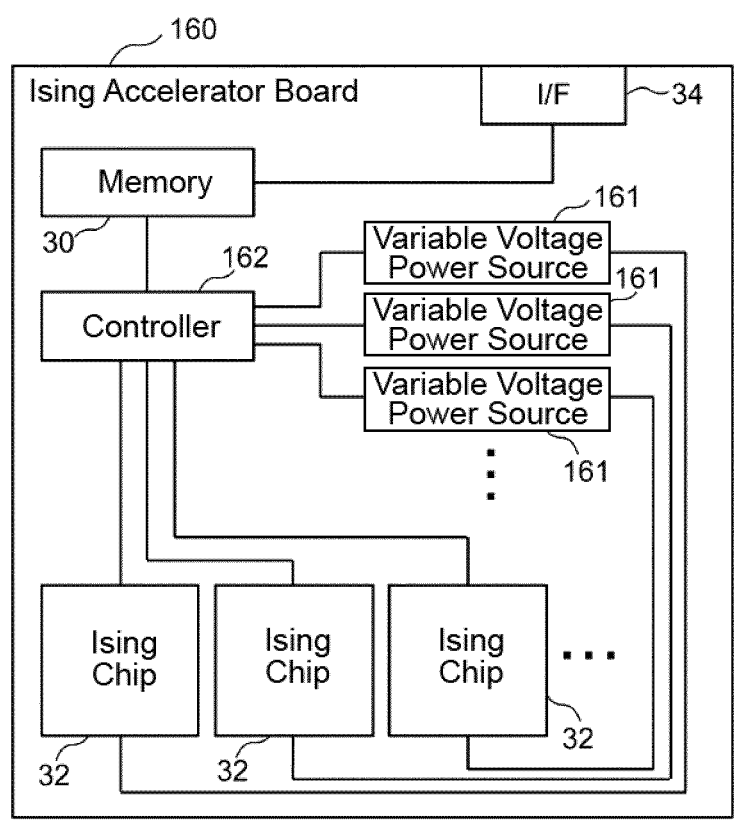
FIG. 40 is a block diagram illustrating another configuration example of an Ising accelerator board.

So, for example, as shown in FIG. 40 in which parts corresponding to those in FIG. 2 are assigned the same reference numerals as those in FIG. 2, variable voltage power sources 161 which supply electric power to the respective corresponding Ising chip 32 are provided on the Ising accelerator board 160 and associated with the Ising chips 32, respectively; and a controller 162 may control these variable voltage power source 161 to decrease the voltage supplied from these variable voltage power source 161 to the respective Ising chips 32 in order to cause the spin values retained by each spin unit 70 in the Ising chip 32 to invert at probability decided by temperature $T_t$ of the cooling schedule described earlier with reference to FIG. 11.

Figure 41:
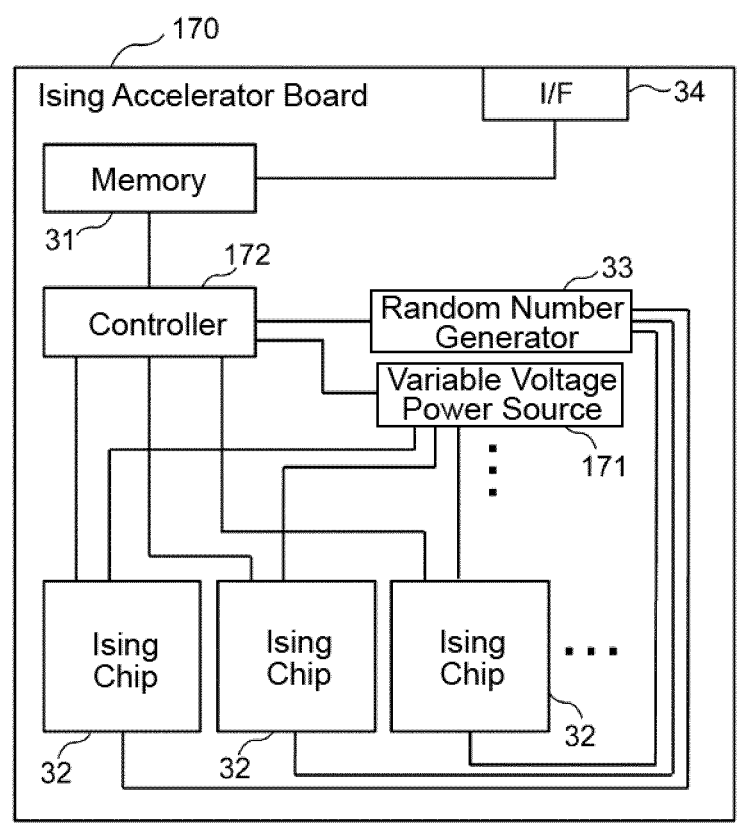
FIG. 41 is a block diagram illustrating another configuration example of an Ising accelerator board.

Furthermore, as shown in FIG. 41 in which parts corresponding to those in FIG. 2 are assigned the same reference numerals as those in FIG. 2, the random number generator 33 for supplying the random number to each Ising chip 32 and a variable voltage power source 171 for supplying electric power to each Ising chip 32 are provided on the Ising accelerator board 170; and a controller 172 may control the random number generator 33 and the variable voltage power source 171 to cause the spin values retained by each spin unit 70 in the Ising chip 32 to invert at probability decided by temperature $T_t$ of the cooling schedule described earlier with reference to FIG. 11.

INDUSTRIAL AVAILABILITY

The present invention can be applied to a wide variety of information processing systems that have various configurations and a function solving problems such as combinatorial optimization by using the semiconductor device for performing the ground-state search of Ising models.

REFERENCE SIGNS LIST 1, 150 information processing system; 2, 151 administrative node; 3 host; 5 operation terminal; 11, 21, 41 CPU; 25, 160, 170 Ising accelerator board; 30, 162, 172 controller; 32 Ising chip; 33 random number generator; 50 spin array; 70 spin unit; 80 UI program; 81 problem conversion program; 82 problem division program; 83 operating condition generation program; 84, 156 Ising control program; 85 solution quality evaluation program; 86 system configuration information; 87 predefined solver operating conditions; 90 board control program; 93 user program; 94 problem definition file; 110 problem input screen; 120 to 122 result presentation screen; 140 API; 141 problem conversion unit; 142 solution quality evaluation unit; 143 system usage acquisition unit; 144 coefficient value input/output unit; 145 spin value input/output unit; 146 interaction activation unit; 147 interaction condition setting unit; 152 storage apparatus; 153 coefficient data; 154 spin data; 155 previous problem database; and 161, 171 variable voltage power source.

What is claimed is:

1. An information processing system that finds a solution of a problem by searching for a ground state of an Ising model, the information processing system comprising:
a host unit equipped with one or more semiconductor chips that execute the ground-state search of the Ising model;
an operation unit that provides a user interface for a user to designate the problem; and
a management unit that converts the problem designated by the user with the user interface into the Ising model and controls the host unit to have the semiconductor chip perform the ground-state search of the converted Ising model;
wherein the user can designate, in addition to the problem, a condition for solving the problem with the user interface;
wherein the management unit generates an operating condition of the semiconductor chip in accordance with the condition designated by the user and sends the generated operating condition and the Ising model of the problem designated by the user to the host unit; and
wherein the host unit controls the semiconductor chip to perform the ground-state search of the Ising model sent from the management unit in accordance with the operating condition sent from the management unit.

2. The information processing system according to claim 1, wherein the condition is solution precision of the problem and time limit for the ground-state search.

3. The information processing system according to claim 2, wherein the operating condition includes the number of times of interactions executed during one ground-state search; and
wherein the management unit:
evaluates, when receiving an execution result of the ground-state search of the Ising model from the host unit, whether the execution result satisfies the solution precision designated by the user or not; and
increases, if the execution result does not satisfy the solution precision designated by the user, the number of times of interactions executed during one ground-state search within a range that satisfies the condition of the time limit.

4. The information processing system according to claim 1, wherein the operation unit includes:
a user program that provides the user interface; and
an API (Application Programming Interface) used by the user program to exchange commands and information with the management unit or the host unit in accordance with a user operation content input via the user interface.

5. The information processing system according to claim 1,
wherein the host unit:
divides the problem supplied from the management unit or an Ising model of a partial problem, which is obtained by dividing the problem, into an Ising model for each semiconductor chip; and
controls each semiconductor chip to have each semiconductor chip independently search for a ground state of the divided Ising model; and
wherein the management unit reads, while each semiconductor chip searches for a ground state of the Ising model, each spin value at a chip boundary of each semiconductor chip, executes interaction calculation, and writes back a calculation result to each semiconductor chip.

6. The information processing system according to claim 1, further comprising a storage apparatus in which each coefficient of the Ising model of the problems previously solved and a spin configuration of a ground state of the Ising model are stored,
wherein the management unit:
searches the previously solved problems, which is stored in the storage apparatus, for the problem of the Ising model whose form is similar to that of the Ising model of a new problem; and reads, when the relevant problem as a result of the search is detected, each coefficient of the Ising model of the problem and the spin configuration of the ground state of the Ising model from the database and sets the each coefficient and spin configuration as each coefficient and spin configuration of the Ising model of a new problem.

7. The information processing system according to claim 1, wherein the host unit includes a random number generator that generates a random number to stochastically invert a spin value of the Ising model retained by the semiconductor chip;

wherein the operating condition includes a cooling schedule that defines in what pattern the random number generator should generate a random number when performing the ground-state search of the Ising model, the operating condition defining an initial temperature, a cooling coefficient and a terminal temperature as the cooling schedule;

wherein the management unit decreases the initial temperature of the cooling schedule included in the operating condition generated in accordance with the condition designated by the user from among the previously solved problems which are stored in the storage apparatus, when detecting the Ising model whose form is similar to that of the Ising model of the new problem.

8. The information processing system according to claim 1, wherein the operating condition includes the number of times of interactions executed during one ground-state search; and wherein the management unit decreases the number of times of interactions executed during one ground-state search, which is included in the operating condition generated in accordance with the condition designated by the user from among the previously solved problems which are stored in the storage apparatus, when detecting the Ising model, whose form is similar to that of the Ising model of the new problem.

9. A management apparatus connected to a computer equipped with one or more semiconductor chips executing a ground-state search of an Ising model, the management apparatus comprising:

a receiver that accepts inputs of a problem whose solution needs to be found, a type of the problem, required precision for solving the problem and time limit;

a conversion unit that converts the problem into a problem of the Ising model based on a specified conversion rule according to the type of the problem;

an operating condition generation unit that decides an operating condition of the semiconductor chip according to the time limit;

a problem division unit that divides the problem of the Ising model into one or more partial problems according to throughput of the computer;

a control unit that sends the partial problem, the operating condition, and an instruction to execute the ground-state search to the computer and receives a result of the ground-state search from the computer; and an evaluation unit that evaluates whether the result of the ground-state search satisfies the required precision or not.

* * * * *